United States Patent
Komano et al.

(10) Patent No.: US 9,588,272 B2
(45) Date of Patent: Mar. 7, 2017

(54) LIGHTING DEVICE AND DISPLAY DEVICE

(71) Applicant: Sharp Kabushiki Kaisha, Osaka-shi, Osaka (JP)

(72) Inventors: Masakazu Komano, Osaka (JP); Katsutoshi Kikuchi, Osaka (JP); Kazunori Minoura, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 14/786,648

(22) PCT Filed: Feb. 25, 2014

(86) PCT No.: PCT/JP2014/054441
§ 371 (c)(1),
(2) Date: Oct. 23, 2015

(87) PCT Pub. No.: WO2014/188748
PCT Pub. Date: Nov. 27, 2014

(65) Prior Publication Data
US 2016/0077270 A1 Mar. 17, 2016

(30) Foreign Application Priority Data

May 24, 2013 (JP) .................................. 2013-109906

(51) Int. Cl.
*F21V 8/00* (2006.01)
*G02F 1/1335* (2006.01)

(52) U.S. Cl.
CPC ......... *G02B 6/0023* (2013.01); *G02B 6/0028* (2013.01); *G02B 6/0068* (2013.01);
(Continued)

(58) Field of Classification Search
CPC .. G02B 6/0028; G02B 6/0023; G02B 6/0083; G02B 6/0068; G02F 1/133615; G02F 1/133512
See application file for complete search history.

(56) References Cited

U.S. PATENT DOCUMENTS 8,210,730 B2 * 7/2012 Kurata ................... G02B 6/002
362/606
9,075,171 B2 * 7/2015 Kurata ................. G02B 6/0016
(Continued)

FOREIGN PATENT DOCUMENTS

CN 101749596 A 6/2010
CN 102089568 A 6/2011
(Continued)

OTHER PUBLICATIONS

Official Communication issued in International Patent Application No. PCT/JP2014/054441, mailed on Jun. 3, 2014.

*Primary Examiner* — Dennis Y Kim
(74) *Attorney, Agent, or Firm* — Keating & Bennett, LLP

(57) ABSTRACT

A backlight device includes LEDs, a light guide plate, an LED board, and a light blocking portion. The light guide plate includes a side surface configured as a light entrance surface through which light from the LEDs enters and a plate surface configured as a light exit surface through which light exits the light guide plate. The LED board on which the LEDs are mounted and at least a portion of which is a light guide plate overlapping portion is on a light exit surface side. The light guide plate overlapping portion overlaps a light entering edge portion that is an edge portion of the light guide plate close to the light entrance surface. The light blocking portion is at the light guide plate overlapping portion of the LED board and between the light guide plate overlapping portion and the light entering edge portion of the light guide plate.

10 Claims, 12 Drawing Sheets

(52) U.S. Cl.
CPC ......... *G02B 6/0083* (2013.01); *G02B 6/0091* (2013.01); *G02F 1/133512* (2013.01); *G02F 1/133615* (2013.01)

(56) References Cited

U.S. PATENT DOCUMENTS

| | | | |
|---|---|---|---|
| 2010/0141865 A1 | 6/2010 | Jung | |
| 2010/0328580 A1* | 12/2010 | Kim | G02B 6/0073 349/64 |
| 2011/0103091 A1 | 5/2011 | Kunimochi et al. | |
| 2011/0122651 A1 | 5/2011 | Komano | |
| 2011/0141397 A1* | 6/2011 | Lee | G02B 6/0083 349/64 |
| 2011/0149203 A1 | 6/2011 | Kim et al. | |
| 2011/0286237 A1* | 11/2011 | Tanoue | G02B 6/0016 362/606 |
| 2012/0002441 A1* | 1/2012 | Yabe | G02B 6/002 362/607 |
| 2013/0044511 A1 | 2/2013 | Motooka et al. | |
| 2014/0036541 A1 | 2/2014 | Takada et al. | |
| 2015/0016145 A1 | 1/2015 | Motooka et al. | |

FOREIGN PATENT DOCUMENTS

| | | |
|---|---|---|
| CN | 202884679 U | 4/2013 |
| JP | 2011-96522 A | 5/2011 |
| JP | 5101701 B2 | 12/2012 |
| JP | 2013-041077 A | 2/2013 |
| JP | 2014-32860 A | 2/2014 |

\* cited by examiner

LIGHTING DEVICE AND DISPLAY DEVICE

TECHNICAL FIELD

The present invention relates to a lighting device and a display device.

BACKGROUND ART

Displays in image display devices have been shifted from conventional cathode-ray tube displays to thin displays, such as liquid crystal displays and plasma displays. With the thin displays, thicknesses of the image displaying devices can be decreased. Liquid crystal panels used in the liquid crystal display devices do not emit light. Therefore, liquid crystal display devices including liquid crystal panels require backlight units. The backlight units are classified broadly into a direct type and an edge-light type based on mechanisms. The edge-light type backlight unit includes alight source, alight source printed circuit board, and a light guide plate. The light source is mounted on the printed circuit board. The light guide plate includes a light entrance surface and a light exit surface. The light entrance surface is opposite the light source and through which light enters the light guide plate and the light exits the light guide plate through the light exit surface. Patent Document 1 discloses an example of a liquid crystal panel display device that includes such a backlight unit.

RELATED ART DOCUMENT

Patent Document

Patent Document 1: Japanese Examined Patent Application Publication No. 5101701.

Problem to be Solved by the Invention

The liquid crystal display device disclosed in Patent Document 1 includes a flexible printed circuit board (FPC). One of edge portions of the FPC is connected to an edge of a liquid crystal panel and the other edge portion of the FPC includes LEDs as light sources. The FPC is folded such that the other edge portion including the LEDs is arranged in the backlight unit. If a demand for reducing the thickness of the liquid crystal display device is raised, reducing in thickness of the light guide plate and reducing in height of the LEDs may be suggested. However, the FPC that is connected to the liquid crystal panel may include electronic components other than the LEDs such as capacitors. Reduction in heights of some of the components may be difficult and thus reduction in thicknesses of the backlight unit and the liquid crystal display device may be limited. The backlight unit holds not only the other edge portion of the FPC including the LEDs but also a restriction member for blocking light that leaks from the light guide plate therein. The restriction member includes a wide sheet and a narrow sheet attached to the wide sheet and is mounted on the light exit surface of the light guide plate. Because of the configuration, reduction in thickness of the backlight unit and the liquid crystal display device is limited.

DISCLOSURE OF THE PRESENT INVENTION

The present invention was made in view of the above circumstances. An object is to reduce thicknesses of a lighting device and a display device.

Means for Solving the Problem

A lighting device of the present invention includes a light source, a light guide plate, a light source board, and a light blocking portion. The light guide plate includes a side surface configured as a light entrance surface through which light from the light source enters and a plate surface configured as a light exit surface though which light exits. The light source board on which the light source is mounted and at least a portion of which is a light guide plate overlapping portion is on a light exit surface side. The light guide plate overlapping portion overlaps a light entering edge portion of the light guide plate. The light blocking portion is at the light guide plate overlapping portion of the light source board and between the light guide plate overlapping portion and the light entering edge portion of the light guide plate.

According to this configuration, light from the light source enters the light guide plate through the light entrance surface, travels throughout the light guide plate, and exits the light guide plate through the light exit surface. Some rays of the light that enter the light guide plate through the light entrance surface may exit immediately through the light entering edge portion, which is the edge portion of the light guide plate close to the light entrance surface, without traveling throughout the light guide plate. If such rays of light leak, the optical performance of the lighting device may degrade. In the lighting device, the light source board on which the light source is mounted includes at least the light guide plate overlapping portion. The light guide plate overlapping portion overlaps the light entering edge portion of the light guide plate, which is an edge portion of the light guide plate close to the light entrance surface, from the light exit surface side. The light blocking portion at the light guide plate overlapping portion is between the light guide plate overlapping portion and the light entering edge portion of the light guide plate. If some rays of light inside the light guide plate straightly exit the light guide plate through the light entering edge portion, the light blocking portion blocks the rays of light. Thus, the optical performance of the lighting device remains preferable. The light blocking portion is at the light guide plate overlapping portion of the light source board on which the light source is mounted. With this configuration, the thickness of the lighting device is reduced in comparison to a conventional configuration in which a restriction member that is a different component from a flexible printed circuit board (FPC) including a light source is disposed in the lighting device for blocking light.

The following configurations of the lighting device according to the present invention are preferable.

(1) The light blocking portion may be in contact with the light exit surface of the light guide plate at the light entering portion. According to this configuration, light straightly exits the light guide plate through the light entering edge portion is properly blocked by the light blocking portion that is in contact with the light exit surface at the light entering edge portion and thus light is less likely to leak. Furthermore, the light blocking portion fixes the position of the light entering edge portion of the light guide plate in a direction perpendicular to the light exit surface. Thus, light entering efficiency of light that exits the light source and enters through the light entrance surface is maintained steady.

(2) The light entering edge portion of the light guide plate may include at least a portion configured as alight entering area extended portion that projects from the light exit surface toward the light source overlapping portion of the light source board. The light entering area extended portion may have a dimension that increases in a projecting direction thereof as a distance to the light source decreases and having a sloped surface on an opposite side from the light entrance surface. According to this configuration, that is, the light entering edge portion of the light guide plate includes the light entering area extended portion that is at least a portion thereof projecting from the light exit surface toward the light guide plate overlapping portion of the light source board, and the light entering area extended portion projects larger as the distance to the light source decreases, an area through which light from the light source enters the light guide plate increases and thus light entering efficiency improves. Since the light entering area extended portion includes the sloped surface on the opposite side from the light entrance surface, some rays of light may leak through the sloped surface. However, the rays of light that leaks through the sloped surface is blocked by the light blocking portion that is between the light guide plate overlapping portion and the light entering edge portion. Thus the optical performance of the lighting device is maintained preferable.

(3) The lighting device may further include a fixing member, at least a portion of which may be arranged between the light blocking portion and the light guide plate overlapping portion of the light source. The fixing member fixes the light blocking portion to the light guide plate overlapping portion. With the fixing member, the light guide plate overlapping portion easily includes the light blocking portion.

(4) The fixing member may include a light guide plate fixing portion that is between the light guide plate overlapping portion of the light source board and the light entering edge portion of the light guide plate. The light guide plate fixing portion may fix the light guide plate overlapping portion to the light entering edge portion. Since the fixing member includes the light guide plate fixing portion that fixes the light guide plate overlapping portion of the light source board to the light entering edge portion of the light guide plate, the position of the light source mounted on the light source board with respect to the light entrance surface of the light guide plate is fixed in a direction that light from the light source travels to the light entrance surface. According to this configuration, the light entering efficiency of light that exits the light source and enters through the light entrance surface is maintained steady. Furthermore, the fixing member that fixes the light blocking portion to the light guide plate overlapping portion of the light source board includes the light guide plate fixing portion. In comparison to a configuration that includes a member for fixing the light source board to the light guide plate separately from the fixing member that fixes the light blocking portion to the light guide plate overlapping portion, the number of components is reduced.

The light source may include a plurality of light sources that are arranged on the light source board at intervals in a direction along a plate surface of the light source board and along the light entrance surface. The light source board may include light source arranged regions and light source non-arranged regions that are alternately arranged in a direction in which the light sources are arranged. The light sources are arranged in the light source arranged regions and not arranged in the light source non-arranged regions. The light guide plate fixing portion may be fixed at least to the light source non-arranged region of the light guide plate overlapping portion of the light source board. Rays of light that exit the light sources, which are arranged at interval on the light source board in a direction along the plate surface of the light source board and along the light entrance surface, enter the light guide plate through the light entrance surface. The density of the amount of light distributed in the light entering edge portion varies by position of the light entering edge portion in the arrangement direction of the light sources according to an arrangement pattern of the light sources. That is, portions of the light entering edge portion that overlap the light source arranged regions in the arrangement direction of the light sources have a higher density in the distribution of the total amount of the light, whereas portions of the light entering edge portion that overlap the light source non-arranged regions in the arrangement direction of the light sources have a lower density. The light guide plate fixing portions are arranged and fixed to at least the light sources non-arranged regions of the light guide plate overlapping portion of the light source board on a selective basis. In comparison to a configuration that includes the light guide plate fixing portions arranged and fixed to the light source arranged regions of the light guide plate overlapping portion of the light source board on a selective basis, the light guide plate fixing portion is less likely to scatter rays of light from the light sources into the light guide plate through the light entrance surface. Thus, the light guide plate fixing portion is less likely to degrade the optical performance of the lighting device.

(6) The light entering edge portion of the light guide plate may include at least a portion that is a fixing projection that projects from the light exit surface toward the light guide plate overlapping portion of the light source board. The fixing projection has a distal end surface that is flat along the light guide plate overlapping portion. The light guide plate fixing portion is fixed to the fixing projection. With this configuration, that is, the light guide plate fixing portion of the fixing member is fixed to the fixing projection of the light guide plate, the position of the light source mounted on the light source board with respect to the light entrance surface of the light guide plate are fixed. Since the distal end surface of the fixing projection that projects from the light exit surface is flat along the light guide plate overlapping portion, the light guide plate fixing portion is stably fixed to the distal end surface and thus the position of the light sources relative to the light entrance surface is maintained steady.

(7) The light blocking portion may be spaced a distance from the fixing projection. According to this configuration, the light blocking portion is less likely to be placed on the fixing projection. Thus, the light blocking portion properly exerts the function of blocking light.

(8) The light guide plate fixing portion may be fixed to the light source non-arranged region and an edge portion of the light source arranged region adjacent to the light source non-arranged region of the light guide plate overlapping portion of the light source board on a selective basis. In comparison to a configuration in which the light guide plate fixing portion is arranged only in the light source non-arranged region of the light guide plate overlapping portion, the light guide plate fixing portion has a larger area to be fixed to the light source board and thus the light source board is stably fixed to the light guide plate. On the other hand, the light guide plate fixing portion that extends to a portion of the light source arranged region of the light guide plate overlapping portion may scatter some of light rays that exit the light sources and enter the light guide plate through the light entrance surface. However, the light guide plate fixing portion is fixed on the edge portion of the light source arranged region adjacent to the light source non arranged region on a selective basis in the light guide plate overlapping portion. With this configuration, an influence of scattering of the light rays which exit the light sources and enter the light guide plate through the light entrance surface by the light guide plate fixing portion is minimized. Thus, the light guide plate fixing portion is less likely to degrade the optical performance of the lighting device.

(9) The lighting device may include a frame having a frame-like shape that surrounds the light guide plate and include at least a portion away from the light entrance surface of the light guide plate with the light sources in between. The light source board may include at least a portion that is a frame overlapping portion. The frame overlapping portion may overlap at least the portion of the frame that is spaced from the light entrance surface with the light sources in between. The fixing member may include a frame fixing portion that is located between the frame overlapping portion of the light source board and the portion of the frame that is spaced from the light entrance surface with the light sources in between. The frame fixing portion fixes the frame overlapping portion of the light source board to the portion of the frame that is spaced from the light entrance surface with the light sources in between. According to this configuration in which the fixing member includes the frame fixing portion that fixes the frame overlapping portion of the light source board to the portion of the frame that is spaced from the light entrance surface with the light sources in between, the position of the light source board on which the light sources are mounted is maintained steady. Namely, the position of the light sources with respect to the light entrance surface of the light guide plate remains steady and thus the light entering efficiency of light from the light sources through the light entrance surface $19a$ is maintained steady. Further, the fixing member that fixes the light blocking portion to the light guide plate overlapping portion of the light source board includes the frame fixing portion. In comparison to a configuration in which a member to fix the light source board to the frame is a different component from the fixing member that fixes the light blocking portion to the light guide plate overlapping portion, the number of components is reduced.

To solve the problem described earlier, a display device according to the present invention includes the above-described lighting device and a display panel. The display panel is on the light exit surface side of the light guide plate. The display panel includes a display area on which images are displayed using light from the light exit surface.

According to the display panel, an overall thickness of the display panel is reduced because the thickness of the lighting device for feeding light to the display panel is reduced. In a configuration that a distance from the light sources to the display area of the display panel is smaller as a result of the reduction in thickness of the display device, light that straightly exits the light guide plate through the light entering edge portion may degrade the quality of images displayed on the display area of the display panel. Since the light blocking portion blocks the leaking light as described above, quality of display images is less likely to degrade.

The following configurations of the lighting device according to the present invention are preferable.

(1) The display device may further include a flexible board connected to an edge of the display panel and may include an electronic component. The flexible board may be a different component from the light source board. It may be difficult to reduce the height of the electronic component mounted on the flexible board, which is connected to the edge of the display panel. However, because the flexible board is a different component from the light source board, even if reduction in height of the electronic component is difficult, such an electronic component is not disposed in a limited space inside the lighting device. Thus, reduction in thickness of the lighting device is not obstructed. The electronic component that has the above-described difficulty in reduction in height is mounted on the flexible board and held in a larger space in the display device in comparison to the space inside the lighting device. Therefore, reduction in thickness of the display device is less likely to be obstructed.

(2) The display device may further includes a panel fixing member between the display panel. The panel fixing member fixes the light source board to the display panel. Since the panel fixing member fixes the light source board to the display panel, the position of the light source board is fixed and thus the position of the light sources mounted on the light source board is less likely to change with respect to the light entrance surface of the light guide plate. Therefore, the light entering efficiency of light form the light sources through the light entrance surface is maintained steady.

(3) The panel fixing member may have a light blocking property. According to this configuration, light that exits the light sources is less likely to straightly enter the display panel or light that exits the light guide plate through the light entering edge portion is less likely to straightly enter the display panel. Therefore, quality of images displayed in the display area of the display panel is less likely to degrade.

(4) The display panel may be a liquid crystal display panel including liquid crystals sealed between a pair of substrates. Such a display device can be used as a liquid crystal display device for many applications such as displays of portable information terminals such as smart phones and tablet-type personal computers.

Advantageous Effect of the Invention

According to the present invention, thicknesses of a lighting device and a display device are reduced.

MODE FOR CARRYING OUT THE INVENTION

<First Embodiment>

Figure 2:
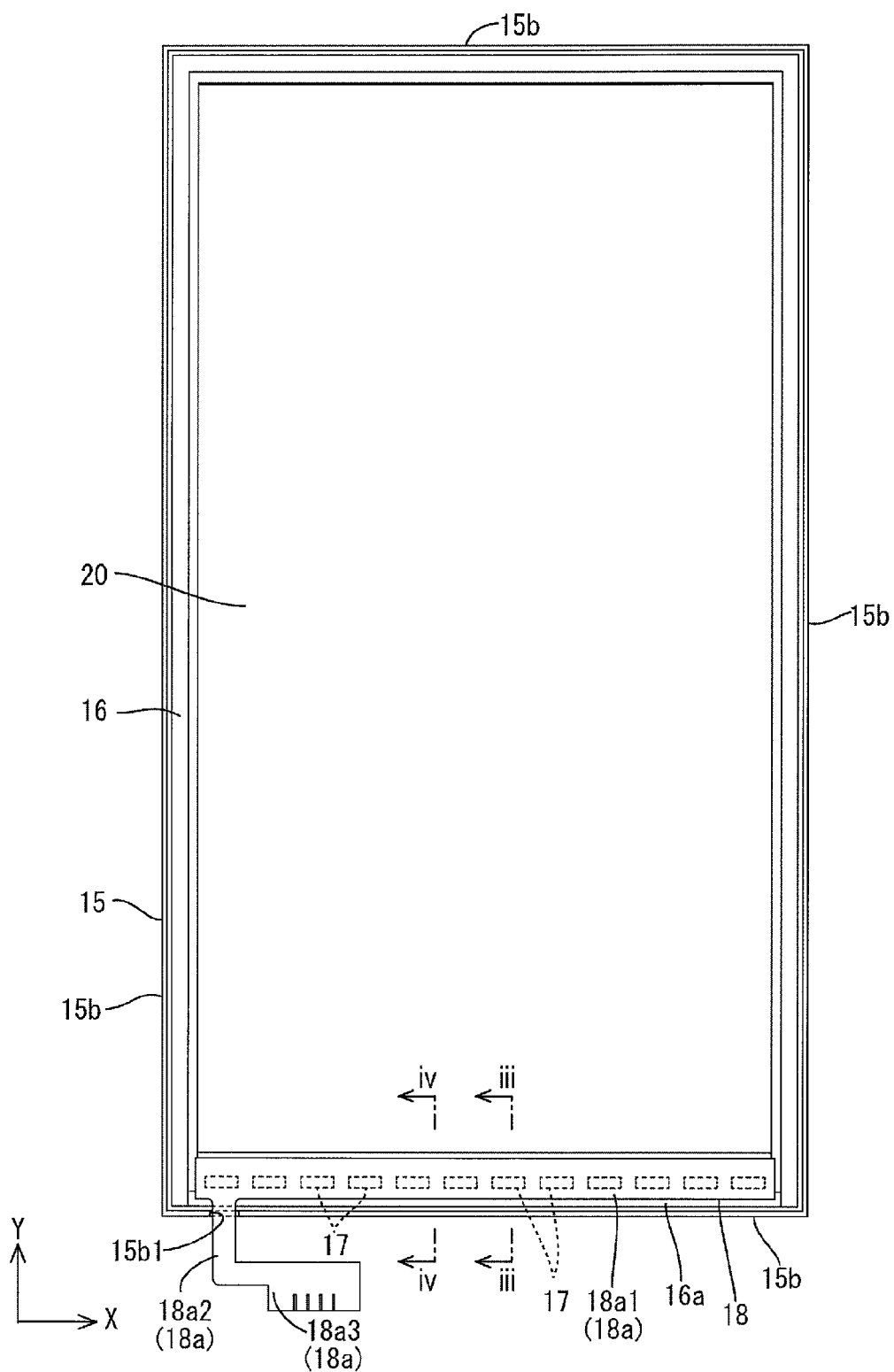
FIG. 2 is a plan view of a backlight device included in the liquid crystal display device.
Figure 3:
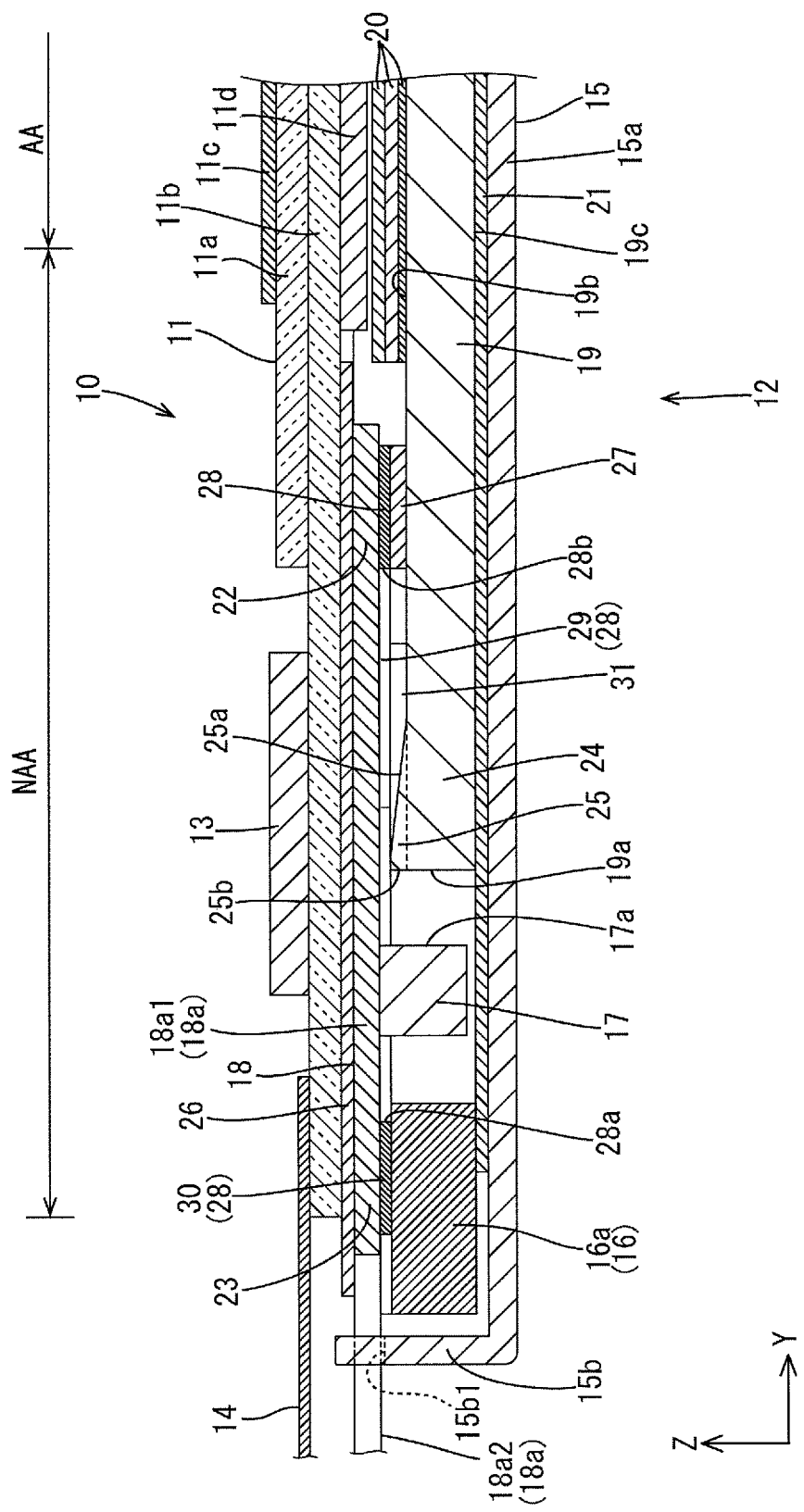
FIG. 3 is a cross-sectional view of the liquid crystal display device cut along line iii-iii in FIG. 3 (the line passing an LED arrangement area).
Figure 4:
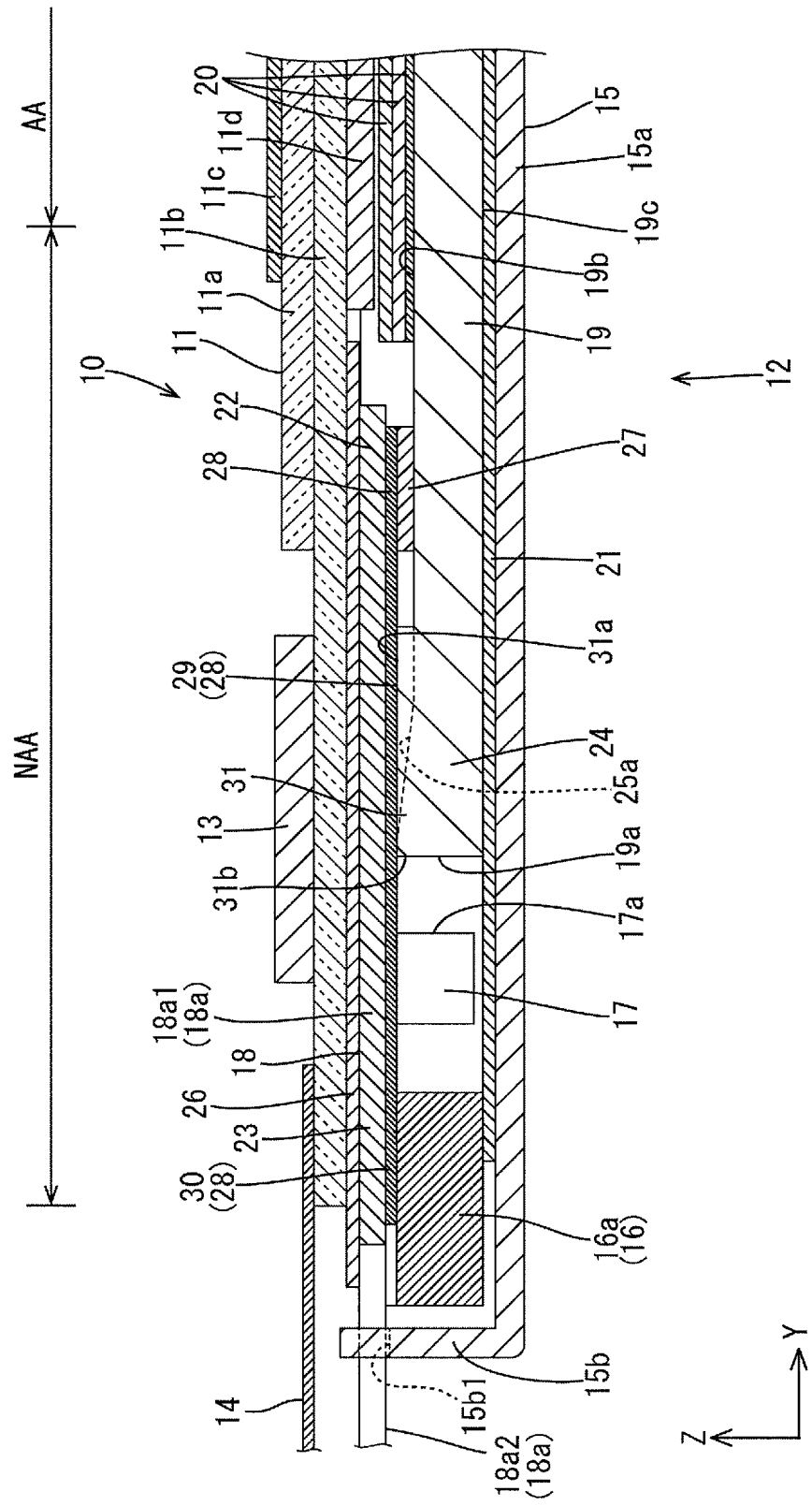
FIG. 4 is a cross-sectional view of the liquid crystal display device cut along line iv-iv in FIG. 3 (the line passing an LED non-arrangement area).

A first embodiment will be described with reference to FIGS. 1 to 6. A liquid crystal display device (a display device) 10 including a liquid crystal panel 11 as a display panel will be described in this description. X-axis, Y-axis and Z-axis may be indicated in the drawings. The axes in each drawing correspond to the respective axes in other drawings. The vertical direction in FIGS. 3 and 4 is defined as a reference. The upper side and the lower side in FIGS. 3 and 4 correspond to the front side and the rear side, respectively.

Figure 1:
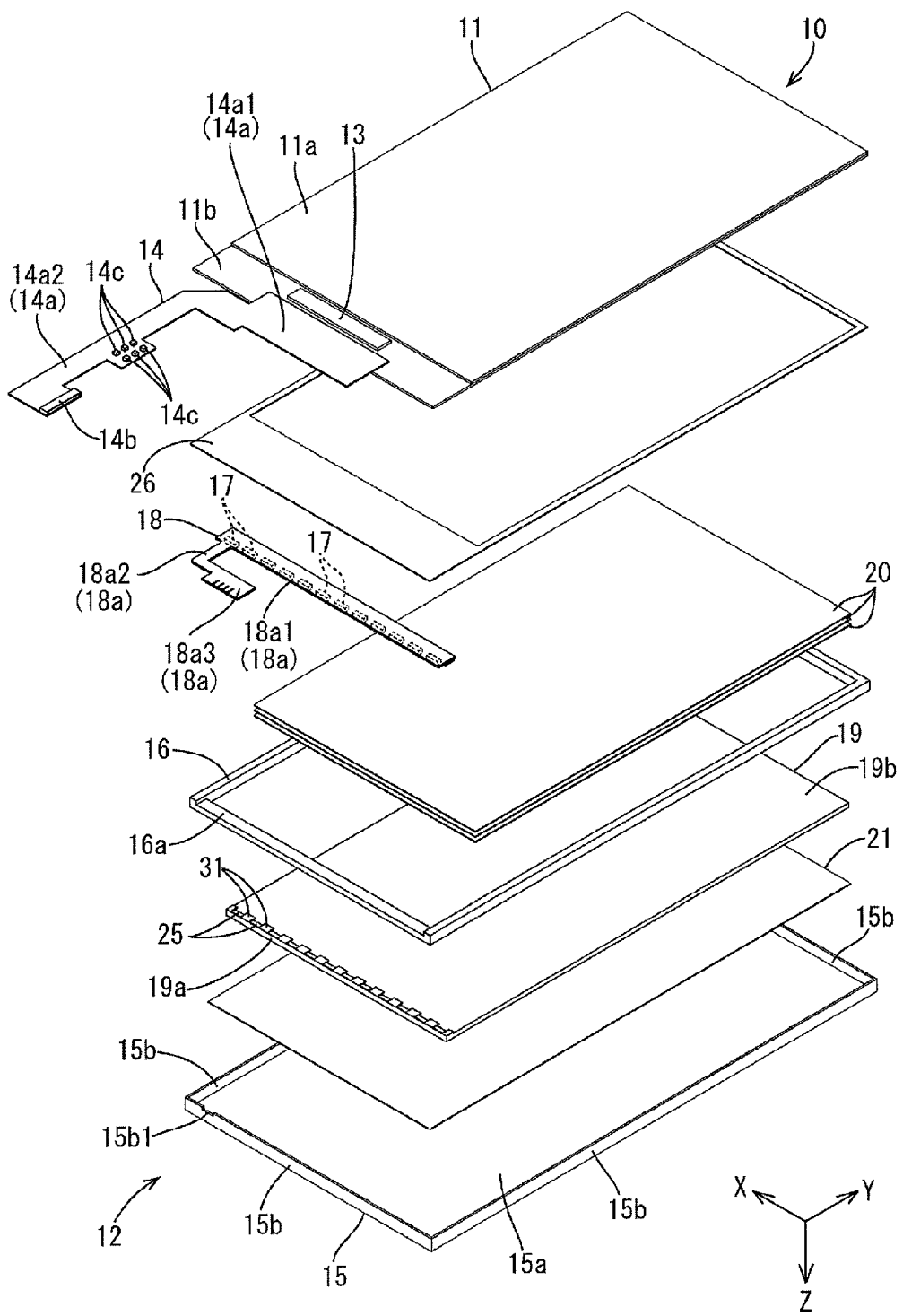
FIG. 1 is an exploded perspective view of a liquid crystal display device according to a first embodiment.

As illustrated in FIG. 1, the liquid crystal display device 10 has a rectangular overall shape. The liquid crystal display device 10 includes the liquid crystal panel (a display panel) 11 and a backlight device (a lighting device) 12 as an external light source. The liquid crystal panel 11 displays images. The backlight device 12 is on the rear side of the liquid crystal panel 11 and configured to provide light to the liquid crystal panel 11. On the front side of the liquid crystal panel 11, an unillustrated frame member may be arranged to sandwich and hold the liquid crystal panel 11 between the frame member and the backlight device 12. Alternatively, an unillustrated touch panel or an unillustrated cover panel may cover a front surface of the liquid crystal panel 11. The liquid crystal display device 10 according to this embodiment is used in portable electronic devices such as smart phones and tablet personal computers. The display size of the liquid crystal panel 11 is from four inches to 20 inches.

The liquid crystal panel 11 will be described. As illustrated in FIGS. 1 and 3, the liquid crystal panel 11 has a rectangular overall shape in a plan view. The liquid crystal panel 11 includes a pair of transparent glass boards 11a, 11b (having light transmissivity) and a liquid crystal layer (not illustrated) in between the boards 11a and 11b. The liquid crystal layer contains liquid crystal molecules, which are substances that change optical characteristics when electromagnetic field is applied. The boards 11a, 11b are bonded together with a sealing agent (not illustrated) with a gap therebetween. The gap corresponds to a thickness of the liquid crystal layer. The liquid crystal panel 11 has a display area (an active area) AA and a non-display area (a non-active area) NAA. The display area AA displays images. The non-display area NAA is around the display area AA and has a frame-like shape (or a picture frame-like shape). A short-side dimension and a long-side dimension of the liquid crystal panel 11 correspond to the X-axis direction and the Y-axis direction, respectively. A thickness dimension of the liquid crystal panel 11 corresponds to the Z-axis direction.

One of the boards 11a, 11b on the front (a front-surface side) is a CF board 11a. The other one of the boards 11a, 11b on the rear (a rear-surface side) is an array board 11b. As illustrated in FIGS. 1 and 3, the long dimension of the array board 11b is longer than the long dimension of the CF board 11a. One of short edge portions of the CF board 11a is aligned with a corresponding edge portion of the array board 11b. The other short edge portion of the array board 11b protrudes outward with respect to a corresponding edge portion of the CF board 11a. On the other short edge portion of the array board 11b protruded outward, a driver 13 (a panel driving portion) and a flexible printed circuit board 14 are mounted. The driver 13 is for driving the liquid crystal panel 11. The flexible printed circuit board 14 is for providing various signals to the driver 13. The driver 13 is directly mounted on the other one of the short edge portions of the array board 11b, that is, mounted using chip on glass (COG) technology. The driver 13 is configured to receive various signals that are transmitted from an unillustrated panel driving circuit via the flexible printed circuit board 14, process the signals, and send the processed signals to a switching element, which will be described later, in the display area AA. Polarizing plates 11c and 11d are bonded on outer surfaces of the respective boards 11a and 11b.

Internal configurations of the display area AA of the liquid crystal panel 11 will be described in detail (not illustrated). A large number of thin film transistors (TFTs) and a large number of pixel electrodes are arranged in a matrix on an inner surface of the array board 11b (a surface facing the liquid crystal layer and the CF board 11a). The TFTs are switching components. Gate lines and source lines are arranged in a matrix around the TFTs and the pixel electrodes. Image data is transmitted to the gate lines and the source lines from the driver 13. The pixel electrodes are made of transparent electrode materials such as indium tin oxide (ITO) and zinc oxide (ZnO) and arranged in corresponding rectangular areas surrounded by the gate lines and the source lines.

On the CF board 11a, a number of color filters are disposed at positions corresponding to pixels. The color filters are arranged such that three colors of R, G and B are repeatedly arranged. Between the color filters, a light blocking layer (a black matrix) is formed to reduce color mixture. A counter electrode that is opposed to the pixel electrodes on the array board 11b is on surfaces of the color filters and the light blocking layer. The CF board 11a is slightly smaller than the array board 11b. On the inner surfaces of the boards 11a and 11b, alignment films for alignment of liquid crystal molecules in the liquid crystal layer are formed, respectively.

The flexible printed circuit board 14 will be described. As illustrated in FIGS. 1 and 3, one of edge portions of the flexible printed circuit board 14 is connected to one of edge portions of the array board 11b that extends outward with respect to the CF board 11a. The other edge portion of the flexible printed circuit board 14 is connected to a panel driving circuit board, which is not illustrated. The flexible printed circuit board 14 includes a base member 14a, a terminal (not illustrated), a connector 14b, and electronic components 14c. The base member 14a is a film-like member having flexibility. The terminal is formed at one of edge portions of the base member 14a. The connector 14b is disposed at the other edge portion of the base member 14a. The electronic components 14c are mounted on the base member 14a. The base member 14a has a substantially L-like overall shape in a plan view. The base member 14a includes a first extended portion 14a1 and a second extended portion 14a2. The first extended portion 14a1 includes the one of the edge portions of the base member 14a including the terminal. The first extended portion 14a1 extends in the X-axis direction (a short-side direction of the array board 11b). The second extended portion 14a2 extends from the first extended portion 14a1 away from the liquid crystal panel 11 in the Y-axis direction. A distal end portion of the second extended portion 14a2 includes the other edge portion of the base member 14a including the connector 14b. The first extended portion 14a1 of the base member 14a is disposed on a front surface of the array board 11b and is electrically and mechanically connected to the edge portion of the array board 11b via unillustrated anisotropic conductive films (ACF). The second extended portion 14a2 extends outward in the Y-axis direction beyond the backlight device 12. The second extended portion 14a2 is folded backward into a substantially U shape and thus the connector 14b arranged at the distal end portion of the second extended portion 14a2 is connected to the panel driving circuit board on the rear side of the backlight device 12. Specifically, the distal end portion of the second extended portion 14a2 includes an edge area extending in the Y-axis direction and the connector 14b is mounted on the edge area. The connector 14b is fitted in a circuit board side connector (not illustrated, as the panel driving printed circuit board is not illustrated) which is connected to the panel driving circuit board. The electronic components 14c are mounted on the second extended portion 14a2 of the base member 14a and at least one of the electronic components 14c is located on the rear of the backlight device 12, together with the connector 14b. On the rear of the backlight device 12, the panel driving circuit board and an LED driving circuit board for driving multiple LEDs 17 of the backlight device 12, which will be described later, are arranged. Space limitation on the rear side of the backlight device 12 is not strict in comparison to the inside of the backlight device 12. In this embodiment, even if reduction in height of the electronic components 14c, such as capacitors, is difficult, such electronic components 14c are mounted on the second extended portion 14a2 of the base member 14a and arranged on the rear of the backlight device 12. Therefore, reduction of the overall thickness of the liquid crystal display device 10 is less likely to be obstructed by the electronic components 14c.

Configurations of the backlight device 12 will be described in detail. The backlight device 12 has a rectangular block-like overall shape in a plan view, similar to the liquid crystal panel 11. As illustrated in FIGS. 1 to 3, the backlight device 12 at least includes a chassis (a casing, a housing) 15, a frame 16, LEDs (Light Emitting Diode) 17 as a light source, an LED printed circuit board (a light source printed circuit board) 18, a light guide plate 19, an optical sheet (an optical member) 20, and a reflection sheet (a reflection member) 21. The chassis 15 has a tray-like shape having an opening on the liquid crystal panel 11 side. The frame 16 is arranged in the chassis 15. The LEDs 17 are mounted on the LED printed circuit board 18. The light guide plate 19 is configured to guide light from the LEDs 17. The optical sheet 20 is placed on the front of the light guide plate 19. The reflection sheet 21 is placed on the rear of the light guide plate 19. In the backlight device 12, the LEDs 17 are disposed close to one of the short sides of the periphery of the liquid crystal panel 11. Namely, the backlight device 12 is an edge-light type (a side-light type). Components of the backlight device 12 will be described.

The chassis 15 is formed from a metal plate, which may be an aluminum plate or an electro galvanized steel plate (SECC). As illustrated in FIGS. 1 to 3, the chassis 15 includes a bottom plate 15a and side plates 15b. The bottom plate 15a has a rectangular plate-like shape in a plan view similar to the liquid crystal panel 11. The side plates 15b extend upward from corresponding edges of the bottom plate 15a (two long edges and two short edges) toward the front side. A long-side dimension and a short-side dimension of the chassis 15 (the bottom plate 15a) correspond to the Y-axis direction and the X-axis direction, respectively. On a rear surface of the bottom plate 15a, printed circuit boards including the panel driving printed circuit board and the LED driving circuit board, which are not illustrated, are mounted. One of the four side plates 15b overlaps the second extended portion 14a2 of the flexible printed circuit board 14 (one of the side plates 15b on the short side or near side in FIG. 1). The one of the side plates 15b includes a leading notch 15b1 through which an extended portion 18a2 of the LED printed circuit board 18, which will be described later, extends outward.

The frame 16 is made of synthetic resin. As illustrated in FIGS. 1 and 2, the frame 16 has a rectangular frame-like shape with outer dimensions slightly smaller than those of the chassis 15. The frame 16 is held in the chassis 15 and surrounded by four side plates 15b of the frame 16. The frame size of the frame 16 is slightly larger than the light guide plate 19, which will be described later, and surrounds a periphery of the light guide plate 19. The frame 16 includes two short-bar portions extending in the X-axis direction and two long-bar portions extending in the Y-axis direction. The short-bar portions and the long-bar portions continue to one another. As illustrated in FIGS. 2 and 3, one of the short-bar portions of the frame 16 overlaps a portion of the LED printed circuit board 18, which will be described later, in a plan view. The one of the short-bar portions is configured as an LED board overlapping portion (a light source board overlapping portion) 16a that is disposed such that the LEDs 17 is between the short-bar portion and a light entrance surface 19a of the light guide plate. The LED board overlapping portion 16a of the frame 16 has a relatively larger width and a relatively smaller thickness than those of other three side-bar portions of the frame 16 (the two long-bar portions and the other one of the short-bar portions on a farther side from the LED board overlapping portion 16a). The thickness of the LED board overlapping portion 16a is a half of the thickness of the LED printed circuit board 18.

As illustrated in FIGS. 1 to 3, each LED 17 includes an LED chip (an LED element), which is a semiconductor light emitting element, disposed on a board and sealed with a resin. The board is fixed to the LED printed circuit board 18. Each LED chip mounted on the board has one main wavelength of emitting light. Specifically, the LED chip that emits light in a single color of blue is used. In the resin that seals the LED chip, phosphors that emit a certain color of light when excited by the blue light emitted by the LED chip are dispersed. An overall color of light emitted by the phosphors is substantially white. The LED includes an anode-side terminal and a cathode-side terminal, which are not illustrated. When a direct current to forward bias the LED flows through the terminals, the LED chip is emitted. The LED 17 includes a light emitting surface 17a that is one of side surfaces thereof adjacent to a surface of the LED 17 mounted on the LED printed circuit board 18. That is, the LEDs 17 are so-called side-emitting type LEDs.

As illustrated in FIGS. 1 to 3, the LED printed circuit board 18 includes a film-like (or a sheet-like) base member (a base member) 18a made of an insulating material having flexibility. On a rear surface of the base member 18a (a plate surface opposite from a surface facing the liquid crystal panel 11, a plate surface facing the frame 16 and the light guide plate 19), the LEDs 17 are surface mounted and traces (not illustrated) for feeding power to the LEDs 17 are formed by patterning. The LED printed circuit board 18 is disposed at only one of short-side portions of the backlight device 12. As illustrated in FIG. 3, the LED printed circuit board 18 is disposed on the front side with respect to the frame 16 and the light guide plate 19. The LED printed circuit board 18 is sandwiched between the liquid crystal panel 11, and the frame 16 and the light guide plate 19 sandwich and. As illustrated in FIGS. 1 and 2, the base member 18a of the LED printed circuit board 18 includes a main portion 18a1, an extended portion 18a2, and an external connecting portion 18a3. The main portion 18a1 extends along the short-side direction (X-axis direction) of the backlight device 12. The extended portion 18a2 extends outward in the Y-axis direction (away from the light guide plate 19) from one of edges of the main portion 18a1. The external connecting portion 18a3 is at a distal end of the extended portion 18a2 and is to be connected the LED driving circuit board. The extended portion 18a2 overlaps the second extended portion 14a2 of the base member 14a of the flexible printed circuit board 14 in a plan view. Similar to the second extended portion 14a2, the extended portion 18a2 is outside of the chassis 15 and is folded toward the rear of the chassis 15 to have a substantially U shape. The external connecting portion 18a3 at the distal end of the extended portion 18a2 is connected to the LED driving circuit board on the rear side of the chassis 15.

Figure 5:
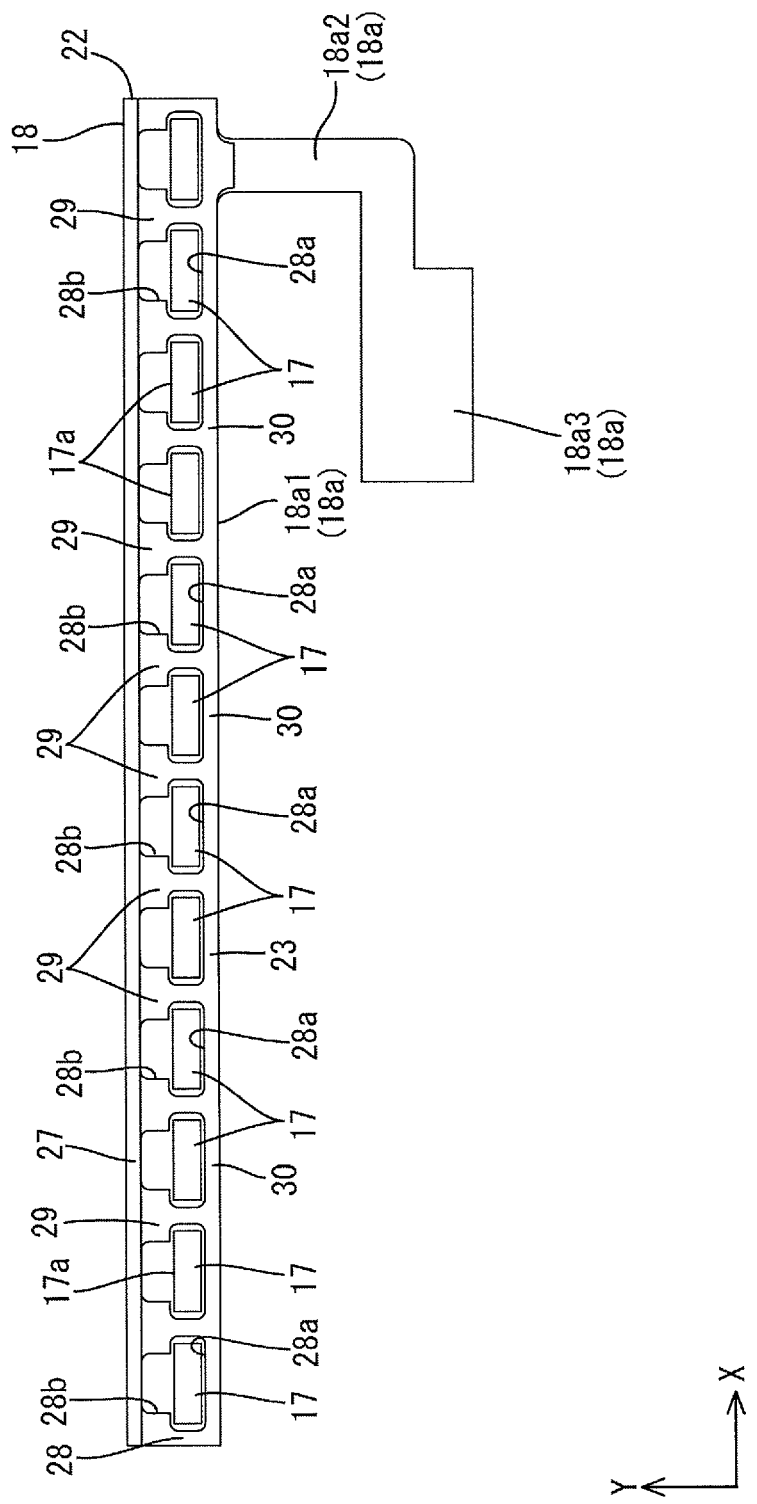
FIG. 5 is a bottom view of an LED board.
Figure 6:
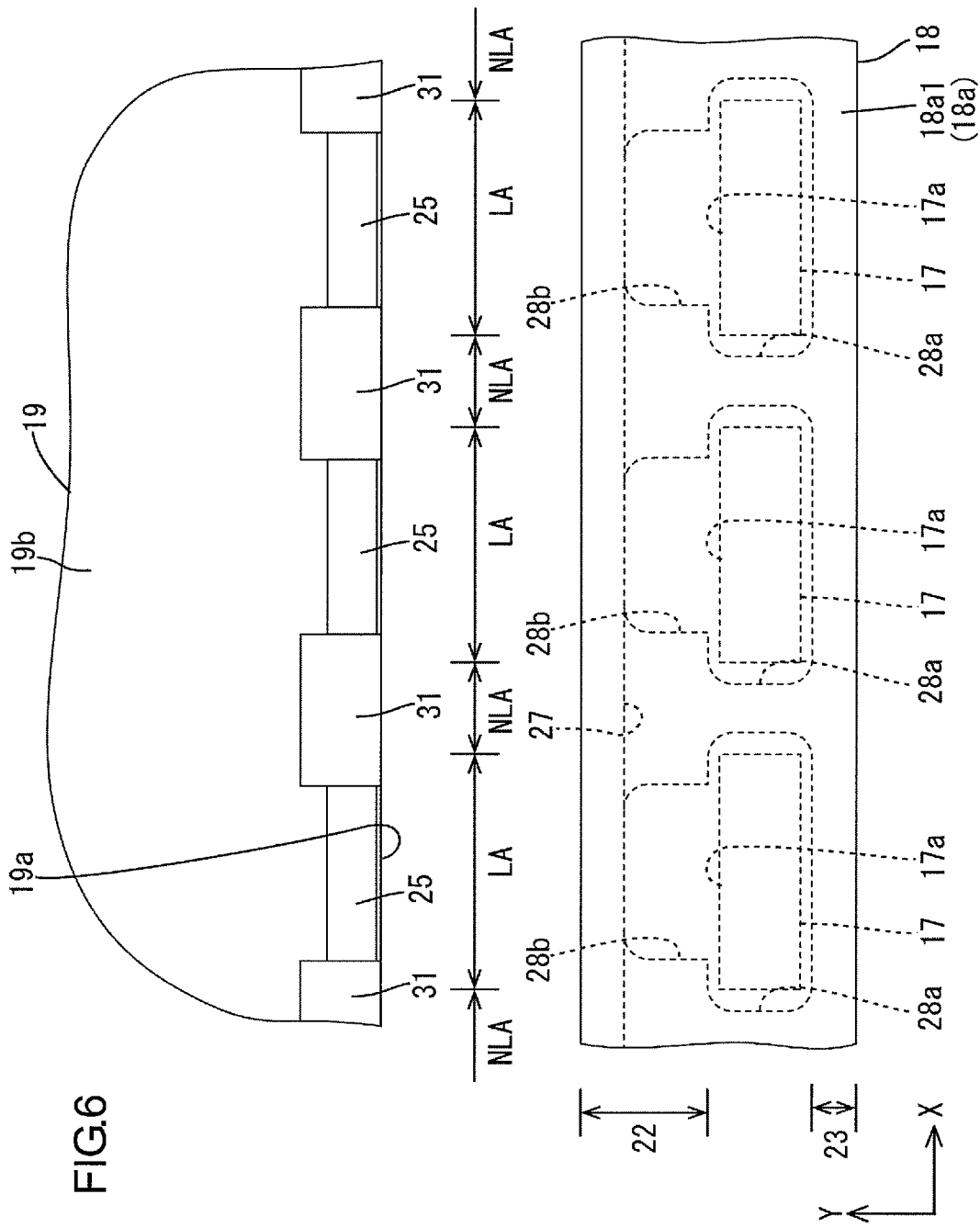
FIG. 6 is a plan view, illustrating a positional relationship in an X-axis direction between an edge portion of the light guide plate including a light entrance surface and the LED board.

As illustrated in FIGS. 1, 3, and 5, the main portion 18a1 has a horizontally-long rectangular shape in a plan view. A length (a long-side dimension) of the main portion 18a1 is substantially equal to or slightly larger than a short-side dimension of the light guide plate 19, which will be described later. A width (a short-side dimension) of the main portion 18a1 is larger than a distance (or a space) between the light entrance surface 19a of the light guide plate 19 and the LED board overlapping portion 16a of the frame 16. The main portion 18a1 includes a light guide plate overlapping portion 22 and a frame overlapping portion 23. The light guide plate overlapping portion 22 is one of edge portions of the width dimension (the short-side dimension, the Y-axis dimension) of the main portion 18a1 and overlaps a portion of the light guide plate 19 (a light entrance surface side portion 24, which will be described later) in a plan view. The frame overlapping portion 23 is the other edge portion of the main portion 18a1 that overlaps the LED board overlapping portion 16a of the frame 16 in a plan view. A portion of the main portion 18a1 between the light guide plate overlapping portion 22 and the frame overlapping portion 23 is an LED mounting portion on which the LEDs 17 are mounted. On the LED mounting portion of the main portion 18a1, the multiple LEDs 17 (ten LEDs in FIGS. 1 and 2) are arranged along a length direction of the main portion 18a1 (the X-axis direction) and connected in series by the traces. Intervals between the adjacent LEDs 17 are substantially constant, that is, the LEDs 17 are arranged at equal intervals. As illustrated in FIG. 6, the main portion 18a1 (or the base member 18a) includes LED arranged regions (a light source arranged region) LA and LED non-arranged regions (a light source non-arranged region) NLA that are alternately arranged in the X-axis direction, namely, in a direction in which the LEDs 17 are arranged. The LEDs 17 are arranged on the respective LED arranged regions LA but not arranged on the LED non-arranged regions NLA.

As illustrated in FIGS. 1 and 3, the LED printed circuit board 18 and the frame 16 are fixed to the liquid crystal panel 11 with a panel fixing member 26. The panel fixing member 26 has a rectangular frame-like shape in a plan view, similar to the frame 16. The panel fixing member 26 includes a base board having black-colored surfaces and thus has light blocking properties. An adhesive agent is applied on each surface of the panel fixing member 26. One of short-side portions of the panel fixing member 26 that overlaps the LED printed circuit board 18 in a plan view has a relatively larger width. Other three side portions have a relatively smaller width. The one of the short-side portions having a larger width is fixed to both a front plate surface of the LED printed circuit board 18 and a rear plate surface of the liquid crystal panel 11. The three side portions having a smaller width are fixed to both front surfaces of the corresponding bar portions of the frame 16 (the bar-potions except the LED board overlapping portion 16a) and the rear plate surface of the liquid crystal panel 11.

The light guide plate 19 has a rectangular shape that is slightly smaller than inner dimensions of the frame 16 in a plan view. As illustrated in FIGS. 1 and 3, plate surfaces of the light guide plate 19 are parallel to the plate surface of the liquid crystal panel 11. A long-side direction and a short-side direction of the plate surface of the light guide plate 19 correspond to the X-axis direction and the Y-axis direction, respectively. A thickness direction of the light guide plate 19 perpendicular to the plate surfaces of the light guide plate 19 corresponds to the Z-axis direction. The light guide plate 19 is arranged directly below the liquid crystal panel 11 and the optical sheet 20 in the chassis 15 and the periphery of the light guide plate 19 is surrounded by the frame 16. Among side surfaces of the light guide plate 19, one of short-side surfaces of the light guide plate 19 on the left in FIG. 3 is the light entrance surface (a light source opposing surface) 19a. The light entrance surface 19a is opposite the LEDs 17 so that light from the LEDs 17 enters the light guide plate 19 through the light entrance surface 19a. Among edge portions of the light guide plate 19, that is, among two long-side edge portions and two short-side edge portions, one of the short-side edge portions of the light guide plate 19 close to the light entrance surface 19a is a light entering edge portion 24. The light entering edge portion 24 is spaced from the LED board overlapping portion 16a of the frame 16 with the LEDs 17 in between. The one of the plate surfaces of the light guide plate 19 facing the front (facing the liquid crystal panel 11) is a light exit surface 19b through which light exits the light guide plate 19 toward the liquid crystal panel 11. In this configuration, a direction in which the LED 17 and the light guide plate 19 are arranged corresponds to the Y-axis direction. Further, a direction in which the optical sheet 20 (or the liquid crystal panel 11) and the light guide plate 19 are arranged corresponds to the Z-axis direction. These directions are perpendicular to each other. The light guide plate 19 is configured to receive light emitted from the LEDs 17 in the Y-axis direction through the light entrance surface 19a, to transmit the light therethrough, and to direct the light toward the optical sheet 20 (the front side, the light exit side). Light exits the light guide plate 19 through the light exit surface 19b, which is the front plate surface of the light guide plate 19.

As illustrated in FIG. 3, the light entering edge portion 24 of the light guide plate 19 includes light entering area extended portions 25 at some portions thereof. Each light entering area extended portion 25 projects from the light exit surface 19b toward the light guide plate overlapping portion 22 of the LED printed circuit board 18. The light entering area extended portion 25 has a substantially a right-triangular cross section and includes a sloped surface 25a on an opposite side from the light entrance surface 19a. That is, the light entering area extended portion 25 projects such that a dimension thereof projecting from the light exit surface 19b gradually increases as a distance to the LEDs 17 (the light entrance surface 19a) decreases and the dimension gradually decreases as the distance to the LEDs 17 increases. Another surface of the light entering area extended portion 25 opposite from the sloped surface 25a is an extended light entering surface 25b. The extended light entering surface 25b is flush with the light entrance surface 19a and is opposite the LEDs 17. Thus, some rays of light from the LEDs 17 enter the light guide plate 19 through the extended light entering surfaces 25b. According to this configuration, the light guide plate 19 has a larger area through which rays of light from the LEDs 17 enter and thus light entering efficiency improves. Namely, this configuration is effective for increasing brightness and reducing power consumption. As illustrated in FIG. 6, a dimension of the light entering area extended portion 25 in the X-axis dimension of the light entering edge portion 24 (a direction in which the LEDs 17 are arranged) overlaps a dimension of a central area of the corresponding LED 17, or in other words, overlaps a dimension of an intermediate area of the corresponding LED arranged region LA in the LED printed circuit board 18. The intermediate area of the LED arranged region LA is a portion except ends of the LED arranged region LA.

As illustrated in FIGS. 1 and 3, the optical sheet 20 is on the light exit surface 19b of the light guide plate 19 and is between the liquid crystal panel 11 and the light guide plate 19. The optical sheet 20 is configured to pass light from the light guide plate 19, to add specific optical effects to the light, and to direct the light toward the liquid crystal panel 11. The optical sheet 20 includes multiple sheet-like members (three sheets in this embodiment) which are layered on one another. The optical sheet 20 has a rectangular shape in a plan view similar to the light guide plate 19. Examples of the optical sheet 20 include a diffuser sheet, a lens sheet, and a reflecting type polarizing sheet. The optical sheets may be selected from those as appropriate.

As illustrated in FIGS. 1 and 3, the reflection sheet 21 covers an opposite plate surface 19c of the light guide plate 19, which is the rear surface or a surface opposite from the light exit surface 19b of the light guide plate 19. The reflection sheet 21 is a rectangular sheet member made of synthetic resin and has a white surface having high light reflectivity. With the reflection sheet 21, rays of light traveling the light guide plate 19 are effectively directed toward the front (toward the light exit surface 19b). The reflection sheet 21 has a rectangular shape in a plan view, similar to the light guide plate 19. An end portion of the reflection sheet 21 close to the light entrance surface 19a extends outward with respect to the light entrance surface 19a. A distal end of the extended portion overlaps the LED board overlapping portion 16a of the frame 16 in a plan view. The extended portion of the reflection sheet 21 is configured to reflect rays of light emitted by the LEDs 17 in a space between the LEDs 17 and the light entrance surface 19a. According to the configuration, light from the LEDs 17 effectively enters through the light entrance surface 19a.

As illustrated in FIGS. 3 and 5, the light guide plate overlapping portion 22, which is a portion of the base member 18a of the LED printed circuit board 18, includes a light blocking portion 27. The light blocking portion 27 blocks rays of light that exit the light guide plate 19 through the light entering edge portion 24. The light blocking portion 27 is made of synthetic resin (e.g. PET). The light blocking portion 27 has white surfaces and thus has high light blocking properties and high light reflectivity. The light blocking portion 27 is at an edge portion of the light guide plate overlapping portion 22 on a side away from the LEDs 17 in the Y-axis direction. More specifically, the light blocking portion 27 is located between the edge portion of light guide plate overlapping portion 22 on the side away from the LEDs 17 and a portion of the light entering edge portion 24 inward in the Y-axis direction with respect to the light entering area extended portion 25 (an away side from the LEDs 17). The light blocking portion 27 is in contact with the light exit surface 19b at the light entering edge portion 24 with little gap in between. With this configuration, the light blocking portion 27 properly blocks rays of light that enter the light guide plate 19 through the light entrance surface 19a and immediately exit through the light entering edge portion 24 without traveling throughout the light guide plate 19. In particular, the light blocking portion 27 blocks rays of light that immediately exit through the sloped surface 25a of the light entering area extended portion 25. This configuration improves optical performance of the backlight device 12 and the quality of images displayed in the display area AA of the liquid crystal panel 11 of the liquid crystal display device 10. Furthermore, since the light blocking portion 27 of the light guide plate overlapping portion 22 is in contact with the light entering edge portion 24, the above-described rays of light are more properly blocked and the position of the light entering edge portion 24 of the light guide plate 19 is properly fixed with respect to the Z-axis direction, that is, a direction normal to the light exit surface 19b. Thus, light entering efficiency of light that exits the LEDs 17 and enters the light guide plate 19 through the light entrance surface 19a is maintained steady. Furthermore, since the light blocking portion 27 has high light reflectivity, light that leaks from the light guide plate 19 is reflected back to the light guide plate 19 by the light blocking portion 27 and thus light use efficiency is improved.

As described above, the LED printed circuit board 18 that is arranged in the backlight device 12 includes the light blocking portion 27. The flexible printed circuit board 14 that is connected to the liquid crystal panel 11 is arranged outside of the backlight device 12. In a conventional device, LEDs are mounted on an FPC that is connected to a liquid crystal panel and the FPC is folded so that the LEDs are arranged in a backlight device. Furthermore, a restriction member that is a single component for blocking light is arranged in the backlight device. If electronic components mounted on the FPC include the electronic components, reduction in height of which is difficult, reduction in thicknesses of the backlight device and the liquid crystal display device may be difficult. Moreover, since the FPC and the restriction member are arranged in the backlight device, reduction in the thickness of the back light device and the liquid crystal display device are further less likely to be achieved. In this embodiment, the LED printed circuit board 18 on which the LEDs 17 are mounted is a different component form the flexible printed circuit board 14 that is connected to the liquid crystal panel 11. Furthermore, the flexible printed circuit board 14 is arranged outside the backlight device 12 while the LED printed circuit board 18 is arranged in the backlight device 12 and includes the light blocking portion 27. Namely, even if electronic component 14c mounted on the flexible printed circuit board 14 includes the electronic components, the reduction in height of which is difficult, such electronic components 14C are arranged in a space outside the backlight device 12 that is larger than a space inside the backlight device 12. This configuration is preferable for reducing the thicknesses of the backlight device 12 and the liquid crystal display device 10. Furthermore, since the flexible printed circuit board 14 is not arranged inside the backlight device 12, the thicknesses of the backlight device 12 and the liquid crystal display device 10 is reduced by the thickness of the flexible printed circuit board 14.

More specifically, as illustrated in FIG. 5, the light blocking portion 27 extends along the length of light guide plate overlapping portion 22 of the base member 18a (the X-axis direction, a direction in which LEDs 17 are arranged). The length of the light blocking portion 27 is substantially the same as the length of the base member 18a (i.e., the light guide plate overlapping portion 22). The width of the light blocking portion 27 is smaller than that of light guide plate overlapping portion 22. That is, as illustrated in FIG. 6, the light blocking portion 27 at the base member 18a extends in the X-axis direction across the LED non-arranged regions NLA and the LED arranged regions LA. According to this configuration, rays of light that immediately exit through the light entering edge portion 24 including the sloped surfaces 25a of the light entering area extended portions 25 are blocked by the light blocking portion 27 at any positions in the X-axis direction (the LED arranged regions LA and the LED non-arranged regions NLA). Thus, light blocking properties are improved.

As illustrated in FIGS. 3 to 5, the light blocking portion 27 having the above configurations is fixed to light guide plate overlapping portion 22 of the base member 18a of the LED printed circuit board 18 with a fixing member 28. The fixing member 28 includes a film-like base material made of synthetic resin and an adhesive is applied to surfaces of the base material. The fixing member 28 is between the light blocking portion 27 and the light guide plate overlapping portion 22 with the surfaces of the fixing member 28 fixed to the light blocking portion 27 and light guide plate overlapping portion 22, respectively. The fixing member 28 has a size that is larger than that of the light blocking portion 27 in a plan-view. The shape of the fixing member 28 substantially the same as the shape of the base member 18a of the LED printed circuit board 18. More specifically, the fixing member 28 has a horizontally long and rectangular plan view shape that extends in the X-axis direction, similar to the base member 18a. The fixing member 28 includes LED holes 28a for passing the LEDs 17 at positions corresponding to the respective LEDs 17 in a plan view, that is, the LED holes 28a are formed at intervals in the X-axis direction. Each LED hole 28a has a horizontally long and rectangular plan view shape that is substantially similar to a plane shape of the LED 17 but the width of the LED holes 28a is slightly larger than the width of the LED 17. The fixing member 28 includes expanded holes 28b that are formed between the LED holes 28a (or LEDs) and the light blocking portion 27. The expanded holes 28b continue to the respective LED holes 28a. The number of the expanded holes 28b is the same as the number of the LED holes 28a. The expanded holes 28b are formed in the fixing member 28 at intervals in the X-axis direction. Each expanded hole 28b continues to the corresponding LED hole 28a. The expanded hole 28b has a horizontally long and rectangular plan view shape similar to the LED hole 28a but the width of the expanded hole 28b in the X-axis direction is smaller than that of the LED hole 28a.

As illustrated in FIGS. 3 to 5, the fixing member 28 having the plan view size larger than that of the light blocking portion 27 is fixed to the light guide plate 19 and the frame 16. Specifically, the fixing member 28 includes light guide plate fixing portions 29 and a frame fixing portion 30. The light guide plate fixing portions 29 fix the light guide plate overlapping portion 22 of the base member 18a of the LED printed circuit board 18 to the light entering edge portion 24 of the light guide plate 19. The frame fixing portion 30 fixes the frame overlapping portion 23 of the base member 18a of the LED printed circuit board 18 to the LED board overlapping portion 16a of the frame 16. With this configuration, the position of the LED printed circuit board 18 including the LEDs 17 is stably fixed with respect to the light entering edge portion 24 of the light guide plate 19 and the LED board overlapping portion 16a of the frame 16. The light entering edge portion 24 and the LED board overlapping portion 16a hold the LEDs 17 therebetween from the front and rear of the LEDs 17 in the Y-axis direction. Thus, light entering efficiency of light that exits the LEDs 17 and enters the light guide plate 19 through the light entrance surface 19a is maintained steady and uneven brightness is less likely to occur. Furthermore, in comparison to a configuration that includes fixing members different from the fixing member 28, such as a member to fix the light guide plate overlapping portion 22 to the light entering edge portion 24 or a member to fix the frame overlapping portion 23 to the LED board overlapping portion 16a, the number of components is reduced and thus the configuration of this embodiment is preferable to reduce the production cost.

As illustrated in FIGS. 4 and 6, the light guide plate fixing portions 29 are between the light guide plate overlapping portion 22 of the base member 18a of the LED printed circuit board 18 and the light entering edge portion 24 of the light guide plate 19. Surfaces of each light guide plate fixing portion 29 are fixed to the light guide plate overlapping portion 22 and the light entering edge portion 24, respectively. The light guide plate fixing portions 29 are arranged at intervals in the X-axis direction on the base member 18a of the light guide plate overlapping portion 22. The intervals are substantially the same as the intervals between the LED non-arranged regions NLA (or fixing projections 31, which will be described later). That is, each light guide plate fixing portion 29 extends across at least an entire area of the LED non-arranged region NLA in the X-axis direction. More specifically, the light guide plate fixing portion 29 extends in the X-axis direction over the entire area of the LED non-arranged region NLA of the light guide plate overlapping portion 22 and further extends into end areas of the respective LED arranged regions LA, namely, the end areas of the LED arranged regions LA adjacent to the LED non-arranged region NLA. On the other hand, the light entering edge portion 24 of the light guide plate 19 includes the fixing projections 31 at portions thereof. Each fixing projection 31 projects from the light exit surface 19b toward the front, namely, toward the light guide plate overlapping portion 22 of the LED printed circuit board 18. The fixing projection 31 has a horizontally-long rectangular (square) cross section. One of surfaces of the fixing projection 31 is a distal end surface 31a that faces the front and is flat along the base member 18a of the LED printed circuit board 18 (the light guide plate overlapping portion 22). The fixing projections 31 are spaced with a predetermined distance from the light blocking portion 27 in the Y-axis direction. Thus, during attaching the LED printed circuit board 18, the light blocking portion 27 is less likely to be placed on (or contact) the fixing projections 31. Another surface of the fixing projection 31 faces the LEDs 17 and is flush with the light entrance surface 19a. This surface is a second extended light entering surface 31b through which light from the LEDs 17 enters. The fixing projection 31 has an area size in the X-axis direction (a direction in which the LEDs 17 are arranged) which overlaps the entire area of the LED non-arranged region NLA and the end areas of the respective LED arranged regions LA, namely, has the area size similar to the area size of the light guide plate fixing portion 29. That is, the substantially entire area of the light guide plate fixing portion 29 is in surface-contact with the flat distal end surface 31a of the fixing projection 31 and is fixed thereto. With this configuration, the light guide plate overlapping portion 22 is tightly and stably fixed to the light entering edge portion 24. Further, the light guide plate fixing portions 29 that are directly fixed to the light entering edge portion 24 (specifically, the fixing projections 31) of the light guide plate 19 are selectively arranged in the X-axis direction in the LED non-arranged regions NLA of the light guide plate overlapping portion 22 of the LED printed circuit board 18. With this configuration, the adhesive of the light guide plate fixing portions 29 is less likely to scatter the light in the light guide plate 19 at the light entering edge portion 24. Furthermore, the light guide plate fixing portions 29 are selectively arranged in the X-axis direction in the LED non-arranged regions NLA and the end areas of the LED non-arranged regions NLA of the light guide plate overlapping portion 22 of the LED printed circuit board 18. With this configuration, the light guide plate fixing portion 29 has a larger area to be fixed to the light entering edge portion 24 and thus the light guide plate fixing portion 29 is more stably fixed to the light entering edge portion 24. Furthermore, scattering of light in the light entering edge portion 24, which may be caused by the adhesive of the light guide plate fixing portion 29, can be minimized.

As illustrated in FIGS. 3 to 5, the frame fixing portion 30 is between the frame overlapping portion 23 of the base member 18a of the LED printed circuit board 18 and the LED board overlapping portion 16a of the frame 16 and surfaces of the frame fixing portion 30 are fixed to the frame overlapping portion 23 and the LED board overlapping portion 16a, respectively. The frame fixing portion 30 extends along a length direction of the frame overlapping portion 23 of the base member 18a (the X-axis direction, the direction in which the LEDs 17 are arranged). The length of the frame fixing portion 30 is substantially the same as the base member 18a (the frame overlapping portion 23). That is, as illustrated in FIG. 6, the frame fixing portion 30 extends along the frame overlapping portion 23 of the base member 18a in the X-axis direction across the LED non-arranged regions NLA and the LED arranged regions LA. According to this configuration, the frame fixing portion 30 has a larger area to be fixed to the frame 16 and thus the LED printed circuit board 18 is tightly and stably fixed to the frame 16.

This embodiment has the configuration described above. Functions of this embodiment will be described. When the liquid crystal display device 10 is turned on, signals related to images are transmitted from the panel driving circuit board to the liquid crystal panel 11 via the flexible printed circuit board 14 and the driver 13 and thus the LEDs 17 are lit. As illustrated in FIG. 3, rays of light from the LEDs 17 are guided by the light guide plate 19 and passed through the optical sheet 20. As a result, the light from the LEDs 17 is converted into even planar light. The liquid crystal panel 11 is illuminated with the planar light and thus predetermined images are displayed in the display area AA of the liquid crystal panel 11.

Functions of the backlight device 12 will be described in detail. As illustrated in FIG. 3, when the LEDs 17 are turned on, rays of light that exit the LEDs 17 and enter the light guide plate 19 through the light entrance surface 19a are totally reflected off an interface between the light guide plate 19 and an air space outside the light guide plate 19, or reflected by the reflection sheet 21. Then, the rays of light travel throughout the light guide plate 19 and exit through the light exit surface 19b toward the optical sheet 20. The light entering edge portion 24 of the light guide plate 19 includes the light entering area extended portions 25 that include the extended light entering surfaces 25b, respectively. Namely, an area through which light enters the light guide plate 19 is increased by the total areas of the extended light entering surfaces 25b and thus the light entering efficiency is increased. Further, the light entering edge portion 24 includes the fixing projections 31 that include the second extended light entering surfaces 31b, respectively. Namely, the area through which light enters the light guide plate 19 is further increased by the total areas of the second extended light entering surfaces 31b and thus the light entering efficiency is further increased. With this configuration, higher brightness is achieved with lower power consumption.

As described above, when the light entering edge portion 24 of the light guide plate 19 includes the light entering area extended portions 25, light in the light entering edge portion 24 may immediately exit through the sloped surfaces 25a, which are on the opposite side from the light entrance surface 19a. However, in this embodiment, the light guide plate overlapping portion 22 of the base member 18a of the LED printed circuit board 18 includes the light blocking portion 27. The position of the light blocking portion 27 in the Z-axis direction is between the light guide plate overlapping portion 22 and the light entering edge portion 24. The position of the light blocking portion 27 in the Y-axis direction is on a side of the light entering area extended portions 25 away from the LEDs 17. According to this configuration, light that immediately exits through the sloped surfaces 25a is blocked by the light blocking portion 27 and thus light that leaks therethrough is less likely to directly enter through the plate surface of the liquid crystal panel 11 or is less likely to directly enter the optical sheet 20 through an edge surface of the optical sheet 20. Furthermore, the panel fixing member 26 that fixes the frame 16 and the LED printed circuit board 18 to the liquid crystal panel 11 has light blocking properties. Thus, together with the light blocking portion 27, the panel fixing member 26 effectively reduces a direct incidence of the leaking light into the liquid crystal panel 11.

As described above, the backlight device (a lighting device) 12 according to this embodiment includes the LEDs (a light source) 17, the light guide plate 19, the LED printed circuit board (a light source board) 18, and the light blocking portion 27. The light guide plate 19 including a side surface configured as the light entrance surface 19a through which light from the LEDs 17 enters the light guide plate 19, and a plate surface configured as the light exit surface 19b through which light exits the light guide plate 19. The LED printed circuit board (a light source board) 18 on which the LEDs 17 are mounted at least includes the light guide plate overlapping portion 22. The light guide plate overlapping portion 22 is on the light exit surface 19b side and overlaps the light entering edge portion 24 of the light guide plate 19. The light entering edge portion 24 is an edge portion of the light guide plate 19 close to the light entrance surface 19a. The light blocking portion 27 is at the light guide plate overlapping portion 22 of the LED printed circuit board 18 and between the light guide plate overlapping portion 22 and the light entering edge portion 24 of the light guide plate 19.

According to this configuration, light from the LEDs 17 enters the light guide plate 19 through the light entrance surface 19a, travels throughout the light guide plate 19, and exits the light guide plate 19 through the light exit surface 19b. Some rays of the light that enter the light guide plate 19 through the light entrance surface 19a may immediately exit through the light entering edge portion 24, which is the edge portion of the light guide plate 19 close to the light entrance surface 19a, without traveling throughout the light guide plate 19. If the some rays of light leak, the optical performance of the backlight device 12 may degrade. In the backlight device 12 according to this embodiment, the LED printed circuit board 18 on which the LEDs 17 are mounted includes at least the light guide plate overlapping portion 22 at a portion thereof. The light guide plate overlapping portion 22 overlaps the light entering edge portion 24 of the light guide plate 19, which is an edge portion of the light guide plate 19 close to the light entrance surface 19a, from the light exit surface 19b side. The light blocking portion 27 at the light guide plate overlapping portion 22 is arranged between the light guide plate overlapping portion 22 and the light entering edge portion 24 of the light guide plate 19. Even if some rays of light inside the light guide plate 19 immediately exit through the light entering edge portion 24, the light blocking portion 27 blocks the rays of light. Thus, the optical performance of the backlight device 12 remains preferable. Furthermore, the light blocking portion 27 is at the light guide plate overlapping portion 22 of the LED printed circuit board 18 on which the LEDs 17 are mounted. In comparison to a conventional configuration that includes a restriction member disposed in the backlight device 12 as a different component from an FPC including the LEDs 17 thereon, the thickness of the backlight device 12 is reduced.

The light blocking portion 27 is in contact with the light exit surface 19b of the light guide plate 19 at the light entering edge portion 24. According to this configuration, light immediately exits the light guide plate 19 through the light entering edge portion 24 is properly blocked by the light blocking portion 27 that is in contact with the light exit surface 19b at the light entering edge portion 24 and thus light is less likely to leak. Furthermore, the light blocking portion 27 fixes the position of the light entering edge portion 24 of the light guide plate 19 with respect to a direction normal to the light exit surface 19b. Thus, light entering efficiency of light that exits the LEDs 17 and enters through the light entrance surface 19a remains steady.

The light entering edge portion 24 of the light guide plate 19 includes the light entering area extended portions 25 at least some portions thereof. The light entering area extended portions 25 project from the light exit surface 19b toward the light guide plate overlapping portion 22 of the LED printed circuit board 18 such that the projecting dimension thereof increases as a distance to the LEDs 17 decreases. The light entering area extended portion 25 includes the sloped surface 25a on the opposite side from the light entrance surface 19a. According to this configuration, that is, the light entering edge portion 24 of the light guide plate 19 includes the light entering area extended portions 25 at least portions thereof that project from the light exit surface 19b toward the light guide plate overlapping portion 22 of the LED printed circuit board 18 such that the projecting dimensions thereof increase as the distance to the LEDs 17 decreases, an area through which rays of light from the LEDs 17 enter the light guide plate 19 increases and thus the light entering efficiency improves. Since the light entering area extended portion 25 includes the sloped surface 25a on the opposite side from the light entrance surface 19a, some of the rays of light may leak through the sloped surface 25a. However, the rays of light that leaks through the sloped surface 25a are blocked by the light blocking portion 27 that is between the light guide plate overlapping portion 22 and the light entering edge portion 24. Thus the optical performance of the backlight device 12 remains preferable.

This embodiment includes the fixing member 28 that is at least between the light blocking portion 27 and the light guide plate overlapping portion 22 of the LED printed circuit board 18. The fixing member 28 fixes the light blocking portion 27 to the light guide plate overlapping portion 22. With the fixing member 28, the light guide plate overlapping portion 22 easily includes the light blocking portion 27.

The fixing member 28 includes the light guide plate fixing portions 29 that are between the light guide plate overlapping portion 22 of the LED printed circuit board 18 and the light entering edge portion 24 of the light guide plate 19. The light guide plate fixing portions 29 fix the light guide plate overlapping portion 22 to the light entering edge portion 24. Since the fixing member 28 includes the light guide plate fixing portions 29 that fix the light guide plate overlapping portion 22 of the LED printed circuit board 18 to the light entering edge portion 24 of the light guide plate 19, the positions of the LEDs 17 mounted on the LED printed circuit board 18 with respect to the light entrance surface 19a of the light guide plate 19 are fixed in a direction that light from the LEDs 17 travels to the light entrance surface 19a. According to this configuration, the light entering efficiency of light that exits the LEDs 17 and enters through the light entrance surface 19a is maintained steady. Furthermore, since the fixing member 28 that fixes the light blocking portion 27 to the light guide plate overlapping portion 22 of the LED printed circuit board 18 includes the light guide plate fixing portions 29, the number of components is reduced in comparison to a configuration that includes an additional member for fixing the LED printed circuit board 18 to the light guide plate 19 different from the fixing member 28 that fixes the light blocking portion 27 to the light guide plate overlapping portion 22.

The LEDs 17 are arranged on the LED printed circuit board 18 at intervals in a direction along a plate surface of the LED printed circuit board 18 and along the light entrance surface 19a. The LED printed circuit board 18 includes the LED arranged regions (a light source arranged region) LA and the LED non-arranged regions (alight source non-arranged region) NLA that are alternately arranged in a direction in which the LEDs 17 are arranged. The LEDs 17 are arranged in the LED arranged regions LA and not arranged in the LED non-arranged regions NLA. The light guide plate fixing portions 29 are fixed at least to the LED non-arranged regions NLA of the light guide plate overlapping portion 22 of the LED printed circuit board 18. When the LEDs 17, which are arranged at intervals on the LED printed circuit board 18 in a direction along the plate surface of the LED printed circuit board 18 and along the light entrance surface 19a, emit rays of light, the rays of light enter the light guide plate 19 through the light entrance surface 19a. Density of distribution of the rays of light that is present in the light entering edge portion 24 of the light guide plate 19 varies depending on positions of the light entering edge portion 24 in the arrangement direction of the LEDs 17 according to an arrangement pattern of the LEDs 17. That is, portions of the light entering edge portion 24 that overlap the LED arranged regions LA in the arrangement direction of the LEDs 17 have a higher density of the distribution of light, whereas portions of the light entering edge portion 24 that overlap the LED non-arranged regions NLA in the arrangement direction of the LEDs 17 have a lower density. The light guide plate fixing portions 29 are selectively arranged and fixed to at least the LED non-arranged regions NLA of the light guide plate overlapping portion 22 of the LED printed circuit board 18. In comparison to a configuration that includes the light guide plate fixing portions 29 that are selectively arranged and fixed to the LED arranged regions LA of the light guide plate overlapping portion 22 of the LED printed circuit board 18, the light guide plate fixing portion 29 is less likely to scatter rays of light from the LEDs 17 into the light guide plate 19 through the light entrance surface 19a. Thus, the light guide plate fixing portion 29 is less likely to degrade the optical performance of the backlight device 12.

The light entering edge portion 24 of the light guide plate 19 includes the fixing projections 31 at portions thereof. The fixing projections 31 project from the light exit surface 19b toward the light guide plate overlapping portion 22 of the LED printed circuit board 18. Each of the fixing projections 31 has the distal end surface 31a that is flat along the light guide plate overlapping portion 22. The light guide plate fixing portions 29 are fixed to the respective fixing projections 31. With this configuration, that is, with the light guide plate fixing portions 29 of the fixing member 28 fixed to the corresponding fixing projections 31 of the light guide plate 19, the positions of the LEDs 17 mounted on the LED printed circuit board 18 are fixed with respect to the light entrance surface 19a of the light guide plate 19. Since the distal end surface 31a of the fixing projection 31 that projects from the light exit surface 19b is flat along the light guide plate overlapping portion 22, the light guide plate fixing portions 29 are stably fixed to the corresponding distal end surfaces 31a and thus the position of the LEDs 17 relative to the light entrance surface 19a is maintained steady.

The light blocking portion 27 is spaced from the fixing projections 31. According to this configuration, the light blocking portion 27 is less likely to be placed on the fixing projections 31. Thus, the light blocking portion 27 properly exerts the function of blocking light.

The light guide plate fixing portions 29 are selectively fixed to each LED non-arranged region NLA and the end areas of the respective LED arranged regions LA adjacent to the LED non-arranged regions NLA of the light guide plate overlapping portion 22 of the LED printed circuit board 18. In comparison to a configuration that includes the light guide plate fixing portions 29 only on the LED non-arranged regions NLA of the light guide plate overlapping portion 22, the light guide plate fixing portions 29 have a larger area to be fixed to the LED printed circuit board 18 and thus the LED printed circuit board 18 is stably fixed to the light guide plate 19. On the other hand, since the light guide plate fixing portion 29 extends into the areas of the LED arranged regions LA of the light guide plate overlapping portion 22, the light guide plate fixing portion 29 may scatter some of light rays that exit the LEDs 17 and enter the light guide plate 19 through the light entrance surface 19a. However, the light guide plate fixing portion 29 of this embodiment is selectively fixed to the edge areas of the LED arranged regions LA adjacent to the LED non arranged region NLA in the light guide plate overlapping portion 22. With this configuration, an influence of scattering of the light, which is the light from the LEDs 17 into the light guide plate 19 through the light entrance surface 19a, by the light guide plate fixing portion 29 is minimized. Thus, the light guide plate fixing portion 29 is less likely to degrade the optical performance of the backlight device 12.

The backlight device 12 includes the frame 16 that surrounds the light guide plate 19 with the frame-like shape and at least a portion of the frame 16 is spaced from the light entrance surface 19a of the light guide plate 19 with the LEDs 17 in between. The LED printed circuit board 18 includes the frame overlapping portion 23 at a portion thereof. The frame overlapping portion 23 overlaps at least the portion of the frame 16 that is spaced from the light entrance surface 19a with the LEDs 17 in between. The fixing member 28 includes the frame fixing portion 30 that is sandwiched between the frame overlapping portion 23 of the LED printed circuit board 18 and the portion of the frame 16 that is spaced from the light entrance surface 19a with the LEDs 17 in between. The frame fixing portion 30 fixes the frame overlapping portion 23 of the LED printed circuit board 18 to the portion of the frame 16 that is spaced from the light entrance surface 19a with the LEDs 17 in between. According to this configuration in which the fixing member 28 includes the frame fixing portion 30 that fixes the frame overlapping portion 23 of the LED printed circuit board 18 to the portion of the frame 16 that is spaced from the light entrance surface 19a with the LEDs 17 in between, the position of the LED printed circuit board 18 on which the LEDs 17 are mounted is maintained steady. Namely, the position of the LEDs 17 with respect to the light entrance surface 19a of the light guide plate 19 remains steady and thus the light entering efficiency of light from the LEDs 17 through the light entrance surface 19a is maintained steady. Further, the fixing member 28 that fixes the light blocking portion 27 to the light guide plate overlapping portion 22 of the LED printed circuit board 18 includes the frame fixing portion 30. In comparison to a configuration in which a member for fixing the LED printed circuit board 18 to the frame 16 is a different component from the fixing member 28 that fixes the light blocking portion 27 to the light guide plate overlapping portion 22, the number of components is reduced.

The liquid crystal display device (a display device) 10 according to this embodiment includes the above-described backlight device 12 and the liquid crystal panel (a display panel) 11. The liquid crystal panel 11 is on the light exit surface 19b side of the light guide plate 19. The liquid crystal panel 11 includes the display area AA in which images are displayed using light from the light exit surface 19b. According to the liquid crystal display device 10, the overall thickness of the liquid crystal display device 10 is reduced because the thickness of the backlight device 12 for feeding light to the liquid crystal panel 11 is reduced. In the liquid crystal display device 10 having a slammer thickness, a distance from the LEDs 17 to the display area AA of the liquid crystal panel 11 is smaller. Namely, light may immediately exits the light guide plate 19 through the light entering edge portion 24 and may degrade the quality of images displayed in the display area AA of the liquid crystal panel 11. The light blocking portion 27 of this embodiment blocks the leaking light as described above and thus quality of display images is less likely to be degraded.

The liquid crystal display device 10 of this embodiment includes the flexible printed circuit board 14 that is a different component from the LED printed circuit board 18. The flexible printed circuit board 14 is connected to the edge of the liquid crystal panel 11 and includes electronic components 14c. It may be difficult to reduce the heights of some of the electronic components 14c that are mounted on the flexible printed circuit board 14, which is connected to the edge of the liquid crystal panel 11. However, since the flexible printed circuit board 14 of this embodiment is a different component from the LED printed circuit board 18, even if reduction in height of the electronic components 14c is difficult, such electronic components 14c are not disposed in a limited space inside the backlight device 12. Thus, reduction in thickness of the backlight device 12 is less likely to be obstructed. The electronic components 14c that have the above-described difficulty in reduction in height are mounted on the flexible printed circuit board 14 and held in a larger space in the liquid crystal display device 10 than the space inside the backlight device 12. Therefore, reduction in thickness of the liquid crystal display device 10 is less likely to be obstructed.

The panel fixing member 26 is between the liquid crystal panel 11 and the LED printed circuit board 18 and is fixed the LED printed circuit board 18 to the liquid crystal panel 11. Since the panel fixing member 26 fixes the LED printed circuit board 18 to the liquid crystal panel 11, the position of the LED printed circuit board 18 is fixed and thus the position of the LEDs 17 mounted on the LED printed circuit board 18 is less likely to change with respect to the light entrance surface 19a of the light guide plate 19. Therefore, the light entering efficiency of light form the LEDs 17 through the light entrance surface 19a is maintained steady.

The panel fixing member 26 has a light blocking property. According to this configuration, light that exits the LEDs 17 is less likely to straightly enter the liquid crystal panel 11 or light that exits the light guide plate 19 through the light entering edge portion 24 is less likely to straightly enter the liquid crystal panel 11. Therefore, quality of images displayed in the display area AA of the liquid crystal panel 11 is less likely to degrade.

The display panel is the liquid crystal panel 11 including the liquid crystals sealed between the pair of the boards 11a and 11b. The display device can be used as the liquid crystal display device 10 for many applications such as displays of portable information terminals such as smart phones and tablet-type personal computers.

<Second Embodiment>

A second embodiment of the present invention will be described with reference to FIGS. 7 and 8. The size of holes formed in a fixing member 128 according to the second embodiment is modified from the one in the first embodiment. Further, the shapes of light entering area extended portions 125 and fixing projections 131 of the second embodiment are modified from those in the first embodiment. Similar configurations, operations, and effects to those of the first embodiment will not be described.

Figure 7:
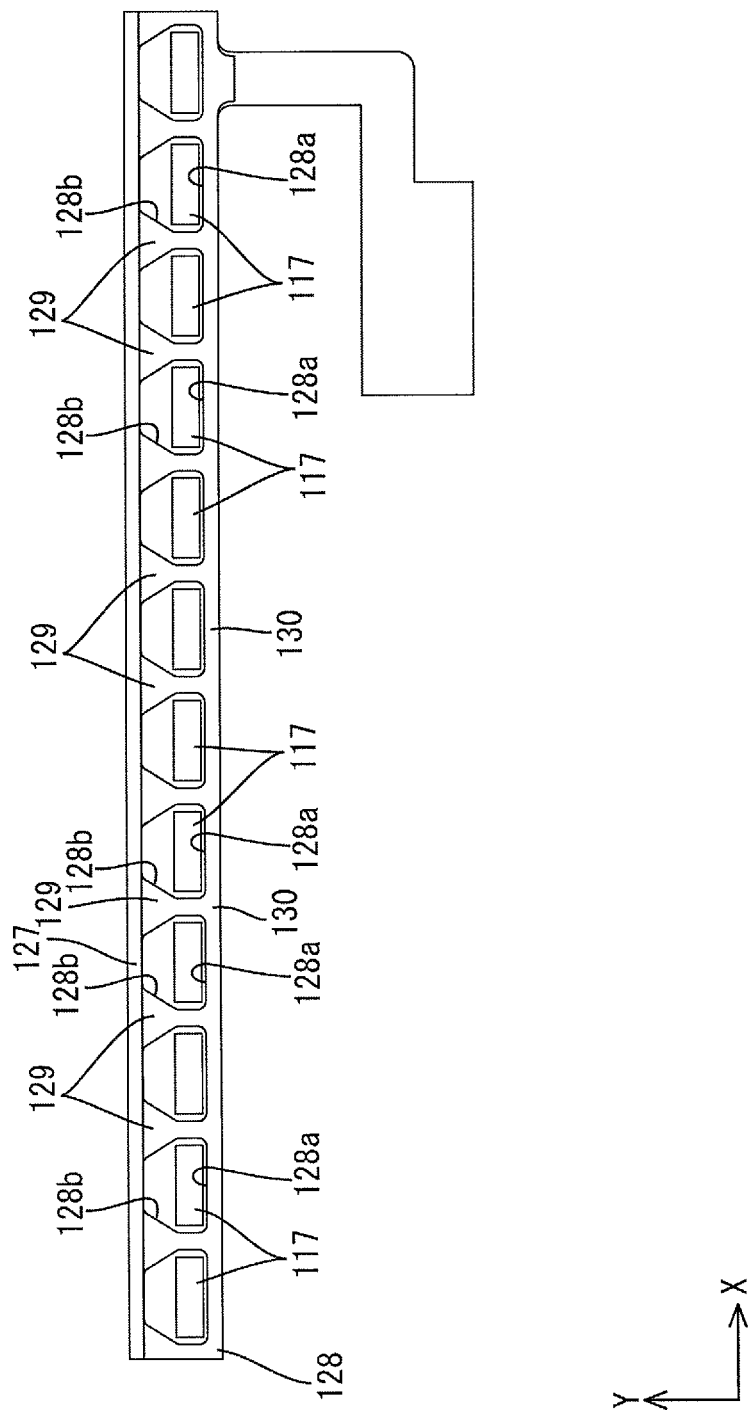
FIG. 7 is a bottom view of an LED board according to a second embodiment.

As illustrated in FIG. 7, the fixing member 128 according to this embodiment has expanded holes 128b each having a trapezoidal shape in a plan view. The width of each expanded hole 128b in the X-axis direction gradually increases as a distance to a corresponding LED hole 128a decreases, and gradually decreases as a distance to a light blocking portion 127 decreases. Light guide plate fixing portions 129 each have a trapezoidal shape with a top base and a bottom base thereof inverted from those of the expanded hole 128b in a plan view. That is, each light guide plate fixing portion 129 has a plan shape that has a dimension in the X-axis direction gradually decreases as a distance to a frame adhesive portion 130 (or LEDs 117) decreases, and gradually increases as a distance to the light blocking portion 127 decreases.

Figure 8:
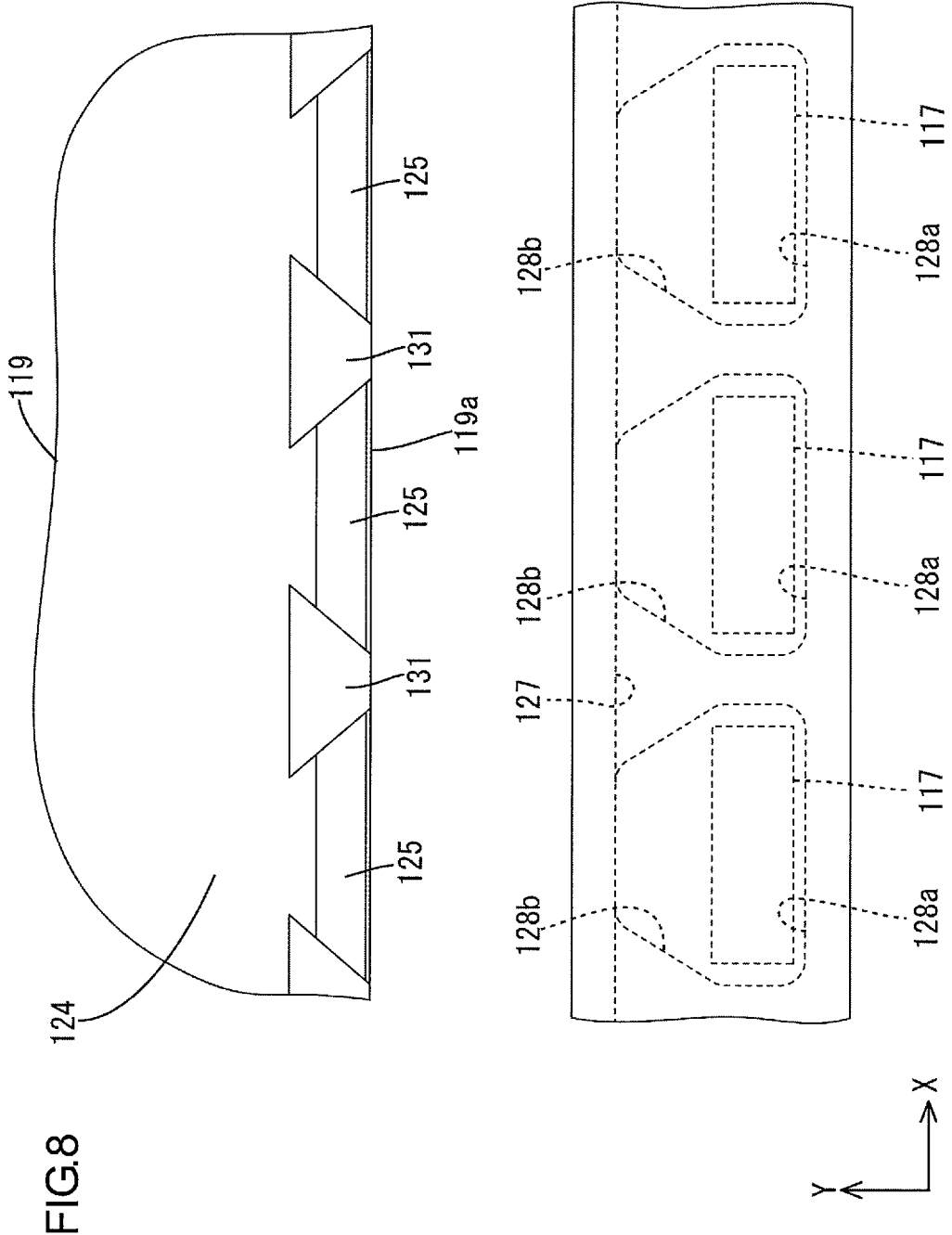
FIG. 8 is a plan view, illustrating a positional relationship in the X-axis direction between an edge portion of a light guide plate including a light entrance surface and the LED board.

As illustrated in FIG. 8, the fixing projections 131 of a light guide plate 119 to which the corresponding light guide plate fixing portions 129 are fixed have a substantially trapezoidal plan shape similar to the light guide plate fixing portions 129. The light entering area extended portions 125 each have a substantially trapezoidal plan shape similar to the expanded holes 128b. An area size of fixing surfaces of the light guide plate fixing portion 129 in the Y-axis direction and an area size of the fixing projection 131 in the Y-axis direction gradually increase as a distance to a light entrance surface 119a of the light guide plate increases and the area sizes gradually decrease as the distance decreases. According to this configuration, rays of light that exit the LEDs 117 and enter through a light entering edge portion 124 are less likely to be scattered by an adhesive of the light guide plate fixing portions 129. Thus, optical characteristics of the backlight device are further improved.

<Third Embodiment>

A third embodiment of the present invention will be described with reference to FIGS. 9 and 10. The size of holes formed in an adhesive member 228 according to the third embodiment is modified from the one in the second embodiment. Further, the shapes of light entering area extended portions 225 and fixing projections 231 of the third embodiment are modified from those in the second embodiment. Similar configurations, operations, and effects to those of the first embodiment will not be described.

Figure 9:
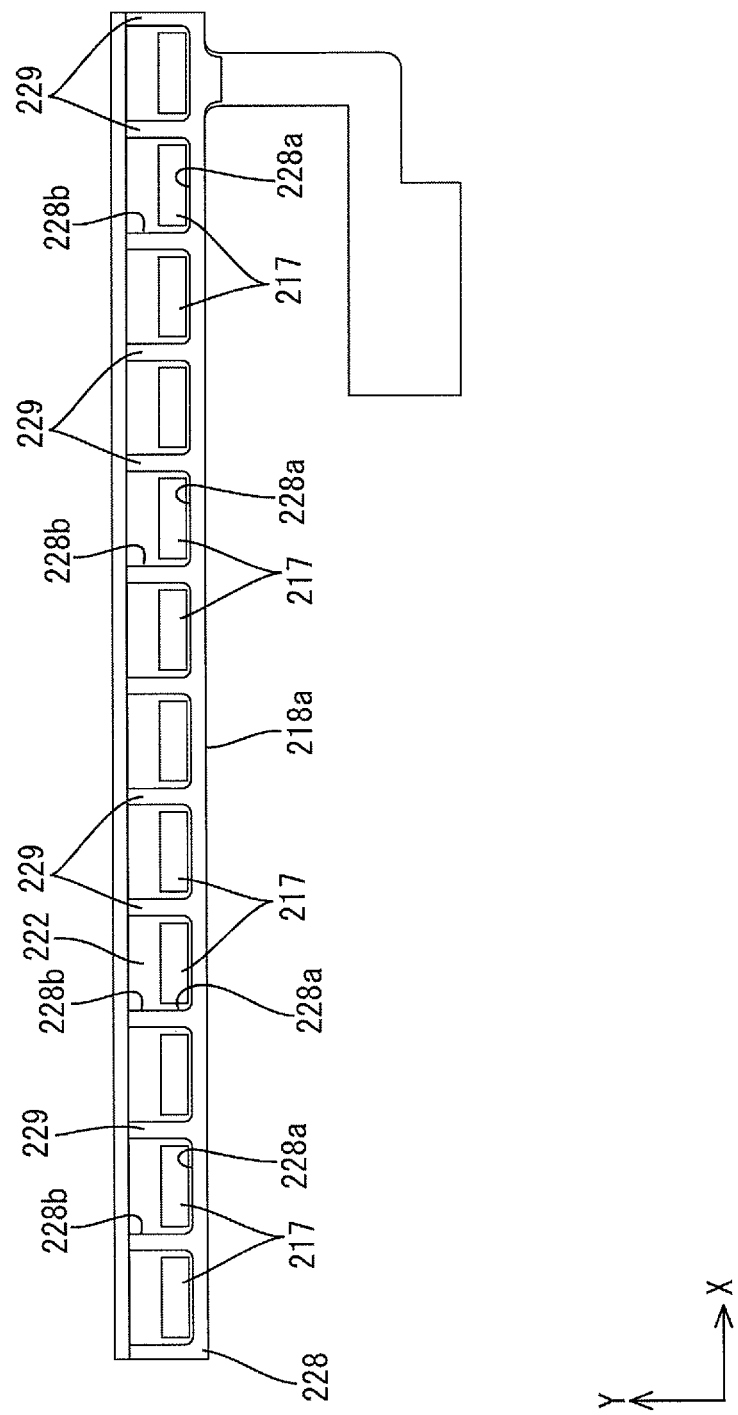
FIG. 9 is a bottom view of an LED board according to a third embodiment.
Figure 10:
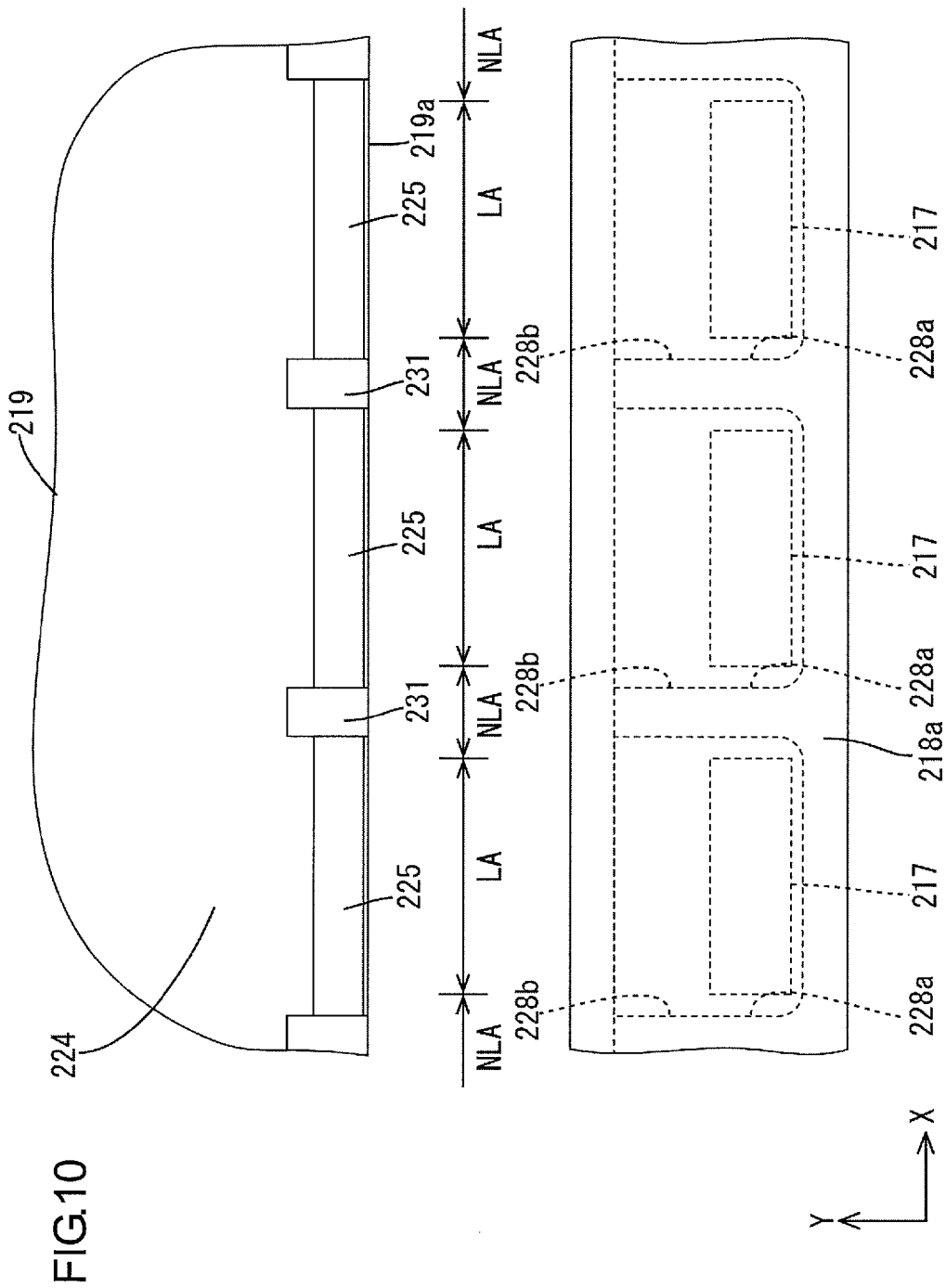
FIG. 10 is a plan view, illustrating a positional relationship in the X-axis direction between an edge portion of a light guide plate including a light entrance surface and the LED board.

As illustrated in FIG. 9, expanded holes 228b of the adhesive member 228 each have a width in the X-axis direction that is substantially equal to a width of a corresponding LED hole 228a. That is, light guide plate fixing portions 229 each have a dimension in the X-axis direction that is smaller than that in the first embodiment. As illustrated in FIG. 10, the position of each light guide plate fixing portion 229 in the X-axis direction with respect to a light guide plate overlapping portion 222 of a base member 218a overlaps substantially an entire area of a corresponding LED non-arranged region NLA, but does not overlap substantially an entire area of an LED arranged region LA. On the other hand, fixing projections 231 of a light guide plate 219 to which the respective light guide plate fixing portions 229 are fixed have a dimension in the X-axis direction smaller than the one in the first embodiment. The fixing projection 231 is in a range in the X-axis direction that overlaps the substantially the entire area of the LED non-arranged region NLA but does not overlap substantially the entire area of the LED arranged region LA. The size of each light entering area extended portion 225 in the X-axis direction is larger than that of the first embodiment. The light entering area extended portion 225 is in a range in the X-axis direction that overlaps substantially the entire area of the LED arranged region LA but does not overlap substantially the entire area of the LED non-arranged region NLA. According to this configuration, in comparison to the first embodiment, the size of the light entering area extended portion 225 in the X-axis direction increases. Thus, light from LEDs 217 efficiently enters through a light entrance surface 219a. Furthermore, the size of the light guide plate fixing portions 229 in the X-axis direction decreases. Thus an adhesive of the light guide plate fixing portions 229 is less likely to scatter light that exits the LEDs 217 and enters a light entering edge portion 224. Thus, optical characteristics of the backlight device are further improved.

<Fourth Embodiment>

A fourth embodiment of the present invention will be described with reference to FIG. 11. The cross section of light entering area extended portions 325 of the third embodiment is modified from the one in the first embodiment. Similar configurations, operations, and effects to those of the first embodiment will not be described.

Figure 11:
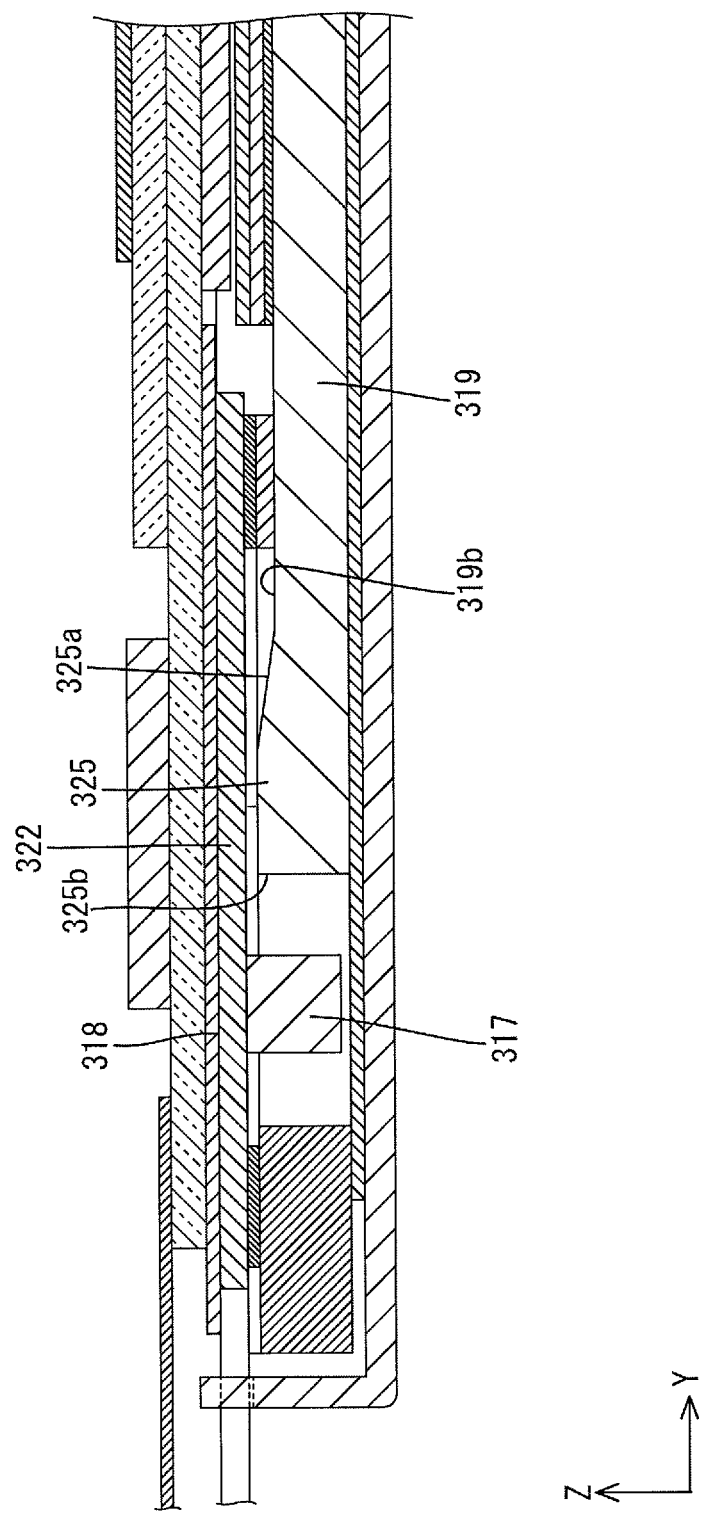
FIG. 11 is a cross-sectional view of a liquid crystal display device according to a fourth embodiment.

As illustrated in FIG. 11, each light entering area extended portion 325 of a light entering edge portion 324 according to this embodiment includes portions having dimensions from a light exit surface 319a in a projecting direction thereof, the dimension of one of which varies and the dimension of the other one of which is constant. The portion of the light entering area extended portion 325 having the dimension that varies has a sloped surface 325a and the length thereof gradually decreases as a distance from LEDs 317 increases. The portion of the light entering area extended portion 325 having the dimension constant has an extended light entering surface 25b and a surface at a distal end thereof. The surface at the distal end is flat along a light guide plate overlapping portion 322 of an LED printed circuit board 318.

<Fifth Embodiment>

A fifth embodiment of the present invention will be described with reference to FIG. 12. In the fifth embodiment, a light guide plate 419 does not include light entering area extended portions and fixing projections that are included in the first embodiment. Similar configurations, operations, and effects to those of the first embodiment will not be described.

Figure 12:
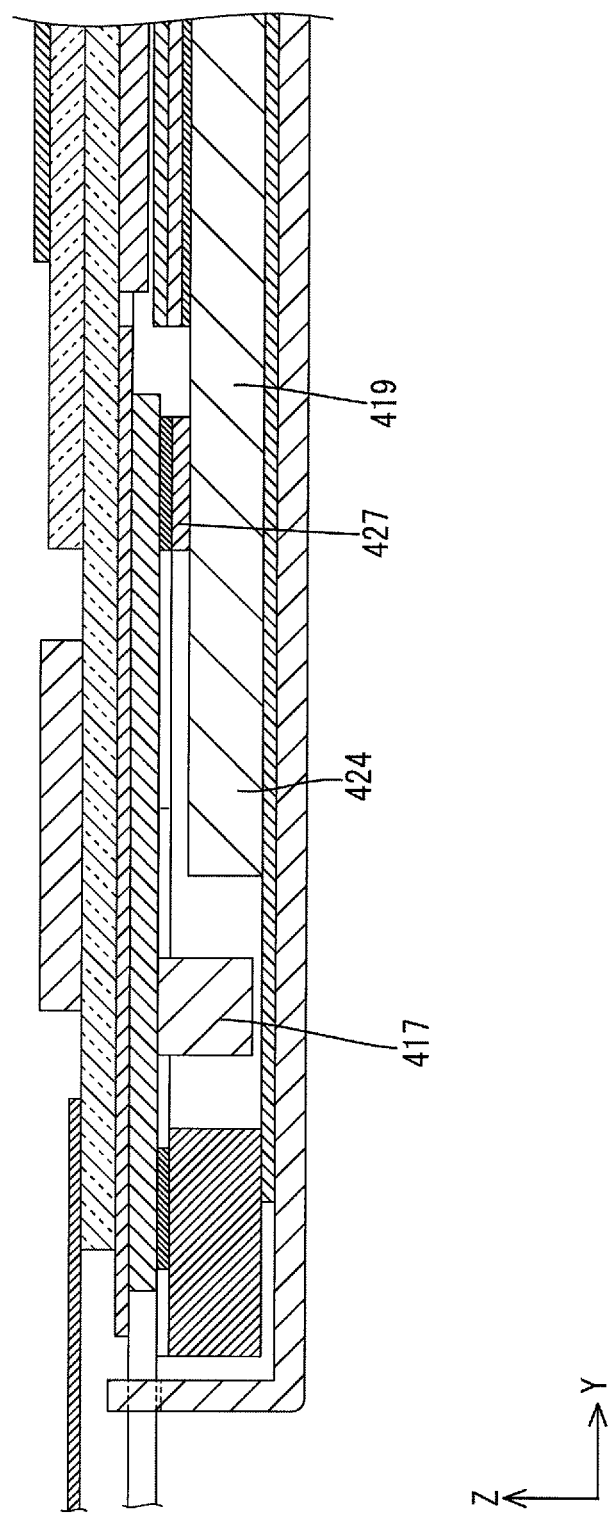
FIG. 12 is a cross-sectional view of the liquid crystal display device according to a fifth embodiment.

As illustrated in FIG. 12, the light guide plate 419 has a thickness substantially the same over an entire area and does not include the light entering area extended portions or the fixing projections included in the first embodiment. According to this configuration, although light that exits LEDs 417 and enters a light entering edge portion 424 may immediately exit through the light entering edge portion 424, light that leaks therethrough is blocked by a light blocking portion 427.

<Other Embodiments>

The technology is not limited to the embodiments described in the above description and the drawings. For example, the following embodiments may be included in technical scopes of the technology.

(1) In the above embodiments, the light blocking portion is in contact with the light entering edge portion of the light guide plate with little gap in between. However, the light blocking portion may be arranged away from the light entering edge portion with a gap therebetween and may not be in contact with the light entering edge portion.

(2) In the above embodiments, the light entering area extended portions of the light entering edge portion of the light guide plate have the sloped surfaces on the side away from the light entrance surface. However, similar to the fixing projections, surfaces of the respective light entering area extended portions on the side away from the light entrance surface may have surfaces that extend straight along the Z-axis direction.

(3) Other than the above embodiments, the plan-view shapes and the X-axis dimensions of the light entering area extended portion and the fixing projection may be properly altered. Similarly, the plan-view shapes and the X-axis dimensions of the expanded holes and the light guide plate fixing portions of the fixing member may be properly altered.

(4) In the above embodiments, the light entering edge portion includes the light entering area extended portions and the fixing projections that are alternately arranged in the X-axis direction. However, the fixing projections may be omitted from the light entering edge portion and the light entering area extended portion may extend over an entire area of the light entering edge portion in the X-axis direction. In such a case, the light guide plate fixing portions may be omitted from the fixing member. On the other hand, the light entering area extended portion may be omitted and the fixing projection may extend over an entire area of the light entering edge portion. In such a case, the expanded hole of the fixing member can be omitted to increase the size of the light guide plate fixing portion.

(5) In each of the above embodiments, the light blocking portion is fixed to the light guide plate overlapping portion of the base member of the LED printed circuit board with the fixing member. However, an adhesive agent may be used to arrange (or integrate) the light blocking portion to the light guide plate overlapping portion. The adhesive may be a thermal curable resin or a photo curable resin (including an ultraviolet curable resin and a visible light curable resin). Other than such adhesives, heat welding or ultrasonic wave welding may be used to arrange the light blocking portion and the light guide plate overlapping portion.

(6) In the configuration described in (5), the fixing member may be omitted to fix the light blocking portion to the base member of the LED printed circuit board. Although it is preferable to use a fixing member to fix the base member of the LED printed circuit board to the light guide plate and the frame, the adhesive member is not a mandatory component. In some cases, the base member of the LED printed circuit board may not be fixed to the light guide plate and the frame (i.e. an adhesive member is not used).

(7) In the above embodiments, the light blocking portion, which is a different component from the base member of the LED printed circuit board, is fixed to the light guide plate overlapping portion with the fixing member. However, the light blocking portion may be a unitary member with the LED printed board. In such a case, a base member of the LED printed circuit board may be made of a light blocking material.

(8) In the above embodiments, the frame includes the frame fixing portion to fix the fixing member thereto. However, the frame may not include the frame fixing portion.

(9) In the above embodiments, the panel fixing member is fixed to the frame and the LED printed circuit board. However, the panel fixing member may be only fixed to the frame and not be fixed to the LED printed circuit board. Alternatively, the panel fixing member may be omitted. In such a case, an adhesive agent (preferably an adhesive agent made of a photo curable resin) may be used instead of the panel fixing member.

(10) In the above embodiments, one of the short edges of the light guide plate facing the LEDs is the light entrance surface. However, one of the long edges of the light guide plate facing the LEDs may be the light entrance surface. Other than the above configurations, two of the short edges of the light guide plate each facing the corresponding LEDs may be the light entrance surfaces, or, two of the long edges of the light guide plate each facing the corresponding LEDs may be the light entrance surfaces. Or else, three of the side surfaces of the light guide plate each facing the corresponding LEDs may be the light entrance surfaces or all of the four side surfaces of the light guide plate may be the light entrance surfaces through each of which light enters.

(11) In the above embodiments, the LED printed circuit board includes a film-shaped base member; however, the base member of the LED printed circuit board may be a board having a certain thickness.

(12) In the above embodiments, the printed circuit board is an LED printed circuit board including LEDs; however, other types of printed circuit board including other types of light sources such as organic ELs may be used.

(13) In the above embodiments, the liquid crystal display device is used in portable information terminals such as smart phones or tablet-type personal computers. However, the liquid crystal display device may be used in in-vehicle information terminals (e.g., portable car navigation systems) and portable video game players.

(14) In the above embodiments, the color portions of the color filtered in the liquid crystal panel are in three colors of R, G, and B. However, the color portions may be provided in four or more colors.

(15) In the above embodiments, TFTs are used as switching components of the liquid crystal display device. However, the technology described above can be applied to liquid crystal display devices including switching components other than TFTs (e.g., thin film diode (TFD)). Moreover, the technology can be applied to not only color liquid crystal display devices but also black-and-white liquid crystal display devices.

EXPLANATION OF SYMBOLS

10: liquid crystal display device (display device), 11: liquid crystal panel (display panel), 11a: CF board (substrate), 11b: array board (substrate), 12: backlight device (lighting device), 14: flexible printed circuit board, 14c: electronic component, 16: frame, 17, 117, 217, 317, 417: LED (light source), 18, 318: LED printed circuit board (light source board), 19, 119, 219, 319, 419: light guide plate, 19a, 119a, 219a: light entrance surface, 19b, 319b: light exit surface, 22, 222, 322: light guide plate overlapping portion, 23: frame overlapping portion, 24, 124, 224, 424: light entering edge portion, 25, 125, 225, 325: light entering area extended portion, 25a, 325a: sloped surface, 26: panel fixing member, 27, 127, 427: light blocking portion, 28, 128, 228: fixing member, 29, 129, 229: light guide plate fixing portion, 30, 130: frame fixing portion, 31, 131, 231: fixing projection, 31a: distal end surface, LA: LED arranged region (light source arranged region), AA: display area, NLA: LED non-arranged region (light source non-arranged region).

The invention claimed is:

1. A lighting device comprising:
a light source;
a light guide plate including a side surface defining a light entrance surface through which light from the light source enters the light guide plate and a plate surface defining a light exit surface through which light exits the light guide plate;
a light source board on which the light source is mounted and at least a portion of which is a light guide plate overlapping portion on a light exit surface side, the light guide plate overlapping portion overlapping a light entering edge portion of the light guide plate, the light entering edge portion being an edge portion of the light guide plate close to the light entrance surface;
a light blocking portion included in the light guide plate overlapping portion of the light source board and being between the light guide plate overlapping portion and the light entering edge portion of the light guide plate; and
a fixing member, at least a portion of which is between the light blocking portion and the light guide plate overlapping portion of the light source board and fixes the light blocking portion to the light guide plate overlapping portion; wherein
the fixing member includes a light guide plate fixing portion between the light guide plate overlapping portion of the light source board and a light entering area extended portion of the light guide plate and fixing the light guide plate overlapping portion to the light entering edge portion;
the light source includes a plurality of light sources on the light source board at intervals in a direction along a plate surface of the light guide plate and along the light entrance surface;
the light source board includes a plurality of light source arranged regions and a plurality of light source non-arranged regions that are alternately arranged in a direction in which the light sources are arranged, the light sources being arranged in the respective light source arranged regions and not arranged in the light source non-arranged region;
the light guide plate fixing portion is selectively fixed to at least the light source non-arranged region of the light guide plate overlapping portion of the light source board;
the light entering edge portion of the light guide plate includes at least a portion defining a fixing projection that projects from the light exit surface toward the light guide plate overlapping portion of the light source board, the fixing projection including a distal end surface that is flat along the light guide plate overlapping portion and to which the light guide plate fixing portion is fixed; and
the light blocking portion is spaced from the fixing projection.

2. The lighting device according to claim 1, wherein the light blocking portion is in contact with a portion of the light exit surface corresponding to the light entering edge portion of the light guide plate.

3. The lighting device according to claim 1, wherein the light entering edge portion of the light guide plate includes at least a portion defining the light entering area extended portion that projects from the light exit surface toward the light guide plate overlapping portion of the light source board, the light entering area extended portion having a dimension that increases in a projecting direction thereof as a distance to the light source decreases and having a sloped surface on an opposite side from the light entrance surface.

4. The lighting device according to claim 1, wherein the light guide plate fixing portion is fixed to the light source non-arranged region and an end portion of the light source arranged region adjacent to the light source non-arranged region of the light guide plate overlapping portion of the light source board.

5. The lighting device according to claim 1, further comprising a frame that surrounds the light guide plate and includes at least a portion spaced away from the light entrance surface of the light guide plate with the light source in between, wherein
the light source board includes at least a portion defining a frame overlapping portion that overlaps the at least the portion of the frame spaced away from the light entrance surface with the light source in between, and
the fixing member includes a frame fixing portion that is between the frame overlapping portion of the light source board and the at least the portion of the frame spaced away from the light entrance surface with the light source in between, the frame fixing portion fixing the frame overlapping portion to the at least the portion of the frame spaced away from the light entrance surface with the light source in between.

6. A display device comprising:
the lighting device according to claim 1;
a display panel arranged on the light exit surface side of the light guide plate and including a display area for displaying an image using light from the light exit surface.

7. The display device according to claim 6, further comprising a flexible board connected to an edge of the display panel and including an electronic component, the flexible board being a different board from the light source board.

8. The display device according to claim 6, further comprising a panel fixing member arranged between the display panel and the light source board and fixing the light source board to the display panel.

9. The display device according to claim 8, wherein the panel fixing member has a light blocking property.

10. The display device according to claim 6, wherein the display panel includes a pair of substrates and liquid crystals sealed between the substrates.

* * * * *